US009715356B2

(12) United States Patent
Koziarz et al.

(10) Patent No.: US 9,715,356 B2
(45) Date of Patent: Jul. 25, 2017

(54) METHOD, APPARATUS AND SYSTEM FOR DETERMINING A MERGED INTERMEDIATE REPRESENTATION OF A PAGE

(71) Applicant: CANON KABUSHIKI KAISHA, Tokyo (JP)

(72) Inventors: Krzysztof Adam Koziarz, Denistone (AU); Paul William Morrison, St Clair (AU)

(73) Assignee: Canon Kabushiki Kaisha, Tokyo (JP)

( * ) Notice: Subject to any disclaimer, the term of this patent is extended or adjusted under 35 U.S.C. 154(b) by 124 days.

(21) Appl. No.: 14/090,983

(22) Filed: Nov. 26, 2013

(65) Prior Publication Data
US 2014/0152700 A1 Jun. 5, 2014

(30) Foreign Application Priority Data
Nov. 30, 2012 (AU) .................. 2012258437

(51) Int. Cl.
| | | |
|---|---|---|
| G09G 5/377 | (2006.01) | |
| G06F 3/12 | (2006.01) | |
| G06F 9/46 | (2006.01) | |
| G06K 15/02 | (2006.01) | |

(Continued)

(52) U.S. Cl.
CPC ............ G06F 3/1215 (2013.01); G06F 3/124 (2013.01); G06F 3/1214 (2013.01); G06F 3/1285 (2013.01); G06F 3/1288 (2013.01); G06F 3/12 (2013.01); G06F 3/1296 (2013.01); G06F 2209/5018 (2013.01); G06K 15/181 (2013.01); G06K 15/1836 (2013.01); G06T 11/20 (2013.01); G06T 11/40 (2013.01);

(Continued)

(58) Field of Classification Search
CPC .............. G09G 5/377; G09G 2340/10; G09G 2340/12; G06T 11/20; G06T 11/40; G06F 3/124; G06F 3/12; G06F 3/1214; G06F 3/1215; G06F 3/1288; G06F 3/1296; G06F 2209/5018; G06K 15/181; G06K 15/1836; G06K 15/1848; G06K 15/1828; G06K 15/1851; G06K 15/1857; G06K 15/186; G06K 15/401; G06K 2215/0011
USPC ........ 345/441, 629, 636, 467; 358/1.13, 1.9, 358/1.1
See application file for complete search history.

(56) References Cited

U.S. PATENT DOCUMENTS

| | | |
|---|---|---|
| 6,753,878 B1 | 6/2004 | Heirich et al. |
| 7,817,307 B2 | 10/2010 | Romney |
| 7,978,196 B2 | 7/2011 | Combes et al. |

(Continued)

*Primary Examiner* — Jin-Cheng Wang
(74) *Attorney, Agent, or Firm* — Canon USA, Inc. I.P. Division

(57) ABSTRACT

A page description language representation of the page is received, the page description language representation having a plurality of sequential graphic objects ordered by drawing order. One or more groups of sequentially adjacent graphic objects of the plurality of sequential objects is formed according to the drawing order. An intermediate representation for each of the groups is generated, the intermediate representation comprising a set of regions where each region of the set of regions is associated with a set of operations required to render at least one of the adjacent graphic objects of one of the groups that intersect the region. An adjacently located set of the intermediate representations is merged to render the page.

26 Claims, 20 Drawing Sheets

(51) Int. Cl.
  *G06T 11/20*     (2006.01)
  *G06T 11/40*     (2006.01)
(52) U.S. Cl.
  CPC ......... *G09G 5/377* (2013.01); *G09G 2340/10* (2013.01); *G09G 2340/12* (2013.01)

(56) References Cited

U.S. PATENT DOCUMENTS

| | | | |
|---|---|---|---|
| 2006/0192983 A1* | 8/2006 | Groarke et al. | 358/1.9 |
| 2007/0206012 A1* | 9/2007 | Combes et al. | 345/441 |
| 2010/0245917 A1* | 9/2010 | Nguyen et al. | 358/1.17 |
| 2010/0245918 A1* | 9/2010 | Nguyen et al. | 358/1.17 |
| 2010/0315431 A1* | 12/2010 | Smith et al. | 345/619 |
| 2011/0299105 A1* | 12/2011 | Morrison et al. | 358/1.9 |
| 2012/0147387 A1* | 6/2012 | Morrison et al. | 358/1.1 |
| 2013/0047162 A1* | 2/2013 | Stefanov et al. | 718/102 |

\* cited by examiner

| Index | Compositing Sequence |
|---|---|
| 1 | White |
| 2 | Grey |
| 3 | Bitmap / Grey |
| 4 | Bitmap / White |

| Index | Compositing Sequence |
|---|---|
| 1 | White |
| 2 | Grey |
| 3 | Bitmap / Grey |
| 4 | Bitmap / White |
| 5 | Light Grey |
| 6 | Dark Grey |

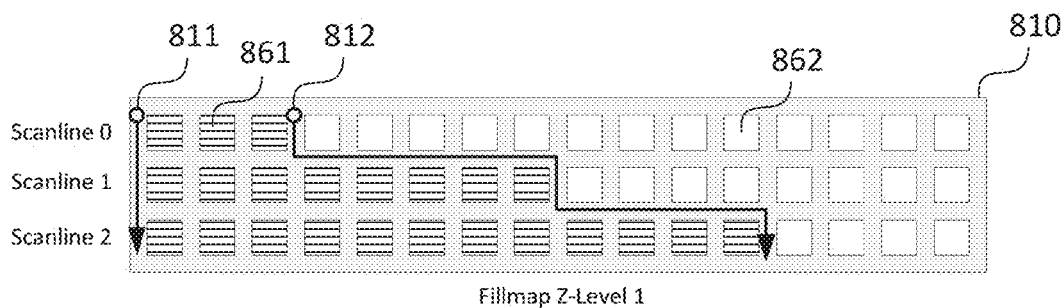
Fig. 8A
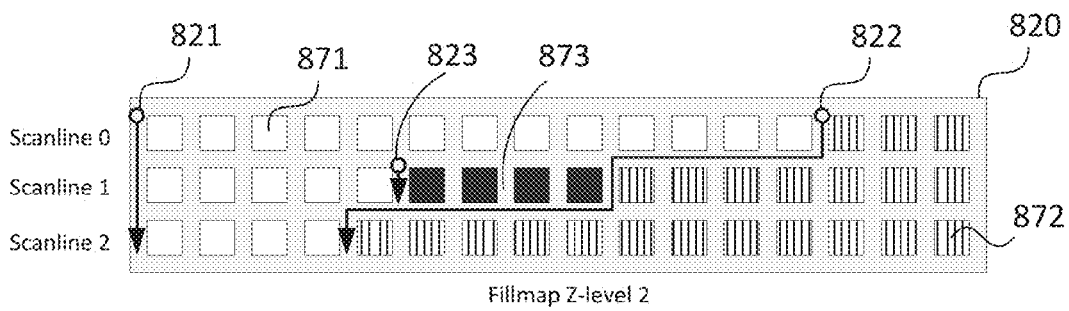
Fig. 8B
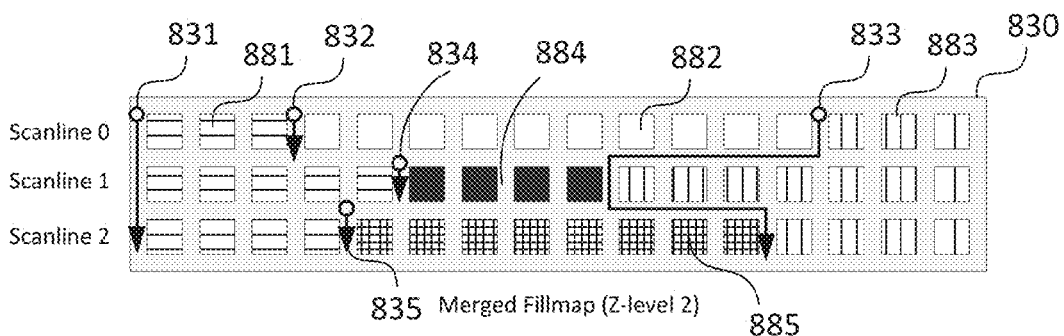
Fig. 8C
Fig. 8D

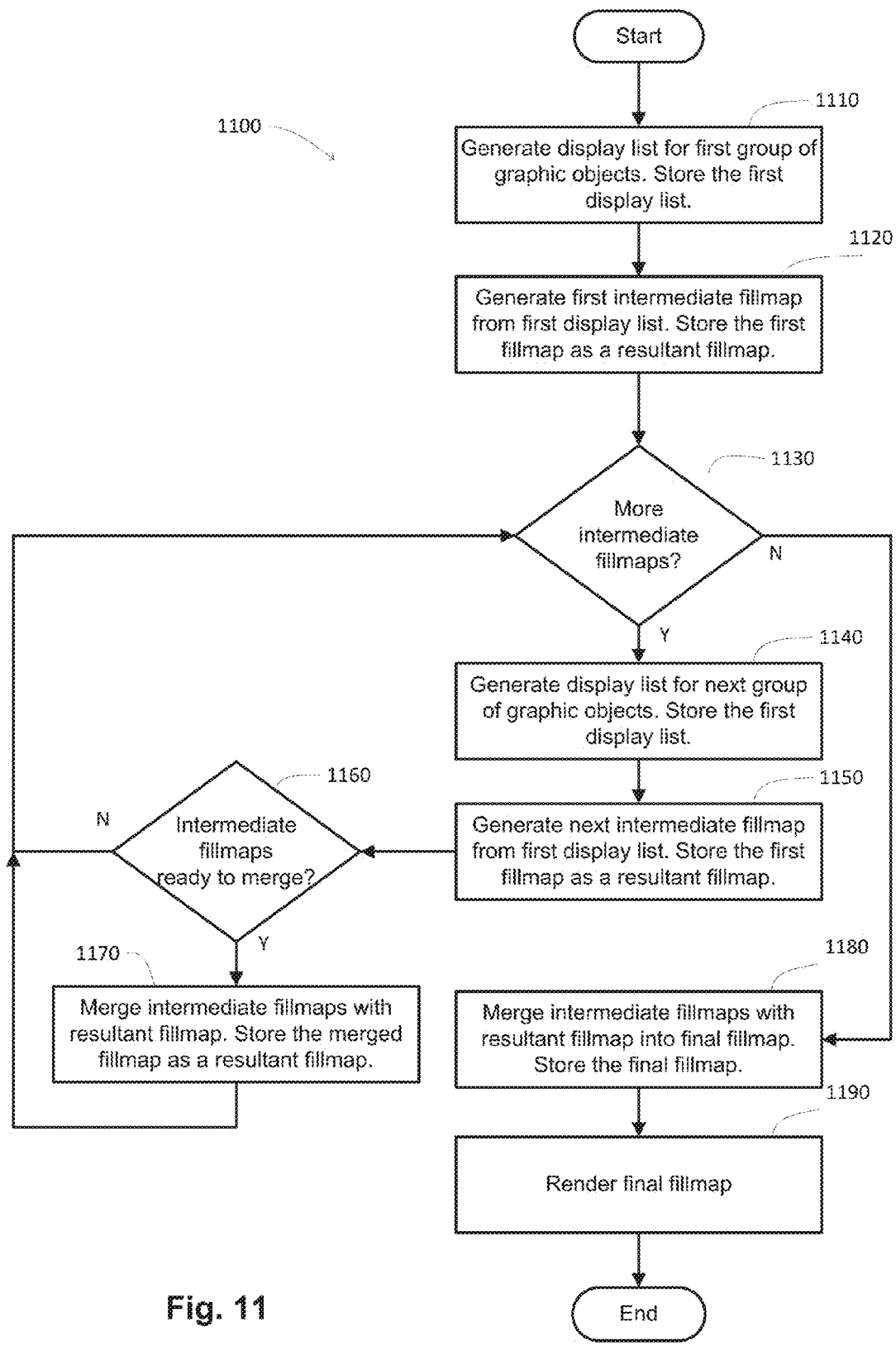

METHOD, APPARATUS AND SYSTEM FOR DETERMINING A MERGED INTERMEDIATE REPRESENTATION OF A PAGE

REFERENCE TO RELATED PATENT APPLICATION(S)

This application claims the benefit under 35 U.S.C. §119 of the filing date of Australian Patent Application No. 2012258437, filed Nov. 30, 2012, hereby incorporated by reference in its entirety as if fully set forth herein.

TECHNICAL FIELD

The present invention relates generally to the field of graphics rendering and, in particular, to a method, apparatus and system for determining a merged intermediate representation of a page. The present invention also relates to a computer program product including a computer readable medium having recorded thereon a computer program for determining a merged intermediate representation of a page.

BACKGROUND

Multi-core and multi-processor architectures in computer systems, including printing systems, have gained widespread use in recent years. Multi-core and multi-processor architectures allow a number of threads belonging to one or more processes to execute in parallel across a number of central processing units (CPUs), thereby reducing overall execution time.

In order to take advantage of such parallelism, a process must typically be broken down into "tasks". A task is a well-defined portion of the overall process to be performed on given input data to produce some output data. The tasks of a process should be largely independent and able to be executed in parallel.

The tasks executed in a renderer sub-system of a printing system commonly process different groups of graphic objects, to produce intermediate representations for different portions of an input page specification. Other tasks then merge the intermediate representations to form a final representation of the entire page.

Conventionally, intermediate representations must be merged in a strict order (e.g., in object "painting" order) so that the final page representation is correct. However, in a multi-core or multi-processor architecture, tasks may complete in any order, causing other dependent tasks (e.g., merge tasks) to wait. This results in periods in which cores are idle, and a delay in completion time for the page. It is desirable that core idle time be minimised and that pages be processed as quickly as possible.

SUMMARY

It is an object of the present invention to substantially overcome, or at least ameliorate, one or more disadvantages of existing arrangements.

According to one aspect of the present disclosure, there is provided a method of merging intermediate representations of a page to be rendered, the method comprising:

receiving a page description language representation of the page, the page description language representation having a plurality of sequential graphic objects ordered by drawing order;

forming a plurality of groups of sequentially adjacent graphic objects of the plurality of sequential objects according to the drawing order;

generating an intermediate representation from each of the groups;

selecting, independently of the drawing order of the plurality of sequential graphic objects, a set of intermediate representations from intermediate representations which have been generated, wherein the selected set of intermediate representations are adjacently located according to an order perpendicular to a plane of the page to be printed; and merging the selected set of intermediate representations to render the page.

According to another aspect of the present disclosure, there is provided an apparatus for determining a merged intermediate representation of a page, the apparatus comprising:

a memory for storing data and a computer program;

a processor coupled to the memory for executing the computer program, the computer program comprising instructions for:

receiving a page description language representation of the page, the page description language representation having a plurality of sequential graphic objects ordered by drawing order;

forming a plurality of sequentially adjacent graphic objects of the plurality of sequential objects according to the drawing order;

generating an intermediate representation from each of the groups;

selecting, independently of the drawing order of the plurality of sequential graphic objects, a set of intermediate representations from intermediate representations which have been generated, wherein the selected set of intermediate representations are adjacently located according to an order perpendicular to a plane of the page to be printed; and merging the selected set of intermediate representations to render the page.

According to another aspect of the present disclosure, there is provided a computer non-transitory readable medium having recorded there a computer program for determining a merged intermediate representation of a page, the program comprising:

code for receiving a page description language representation of the page, the page description language representation having a plurality of sequential graphic objects ordered by drawing order;

code for forming a plurality of sequentially adjacent graphic objects of the plurality of sequential objects according to the drawing order;

code for generating an intermediate representation from each of the groups;

code for selecting, independently of the drawing order of the plurality of sequential graphic objects, a set of intermediate representations from intermediate representations which have been generated, wherein the selected set of intermediate representations are adjacently located according to an order perpendicular to a plane of the page to be printed; and code for merging the selected set of intermediate representations to render the page.

Other aspects of the invention are also disclosed.

BRIEF DESCRIPTION OF THE DRAWINGS

At least one embodiment of the present invention will now be described with reference to the following drawings, in which:

FIG. 8A shows an example intermediate fillmap;

FIG. 8B shows another example intermediate fillmap;

FIG. 8C shows a merged fillmap formed from the intermediate fillmaps of FIGS. 8A and 8B;

FIG. 8D shows a key for interpreting FIGS. 8A to 8C;

FIG. 11 shows a flow chart of a method of rendering a fillmap;

DETAILED DESCRIPTION INCLUDING BEST MODE

Figure 1:
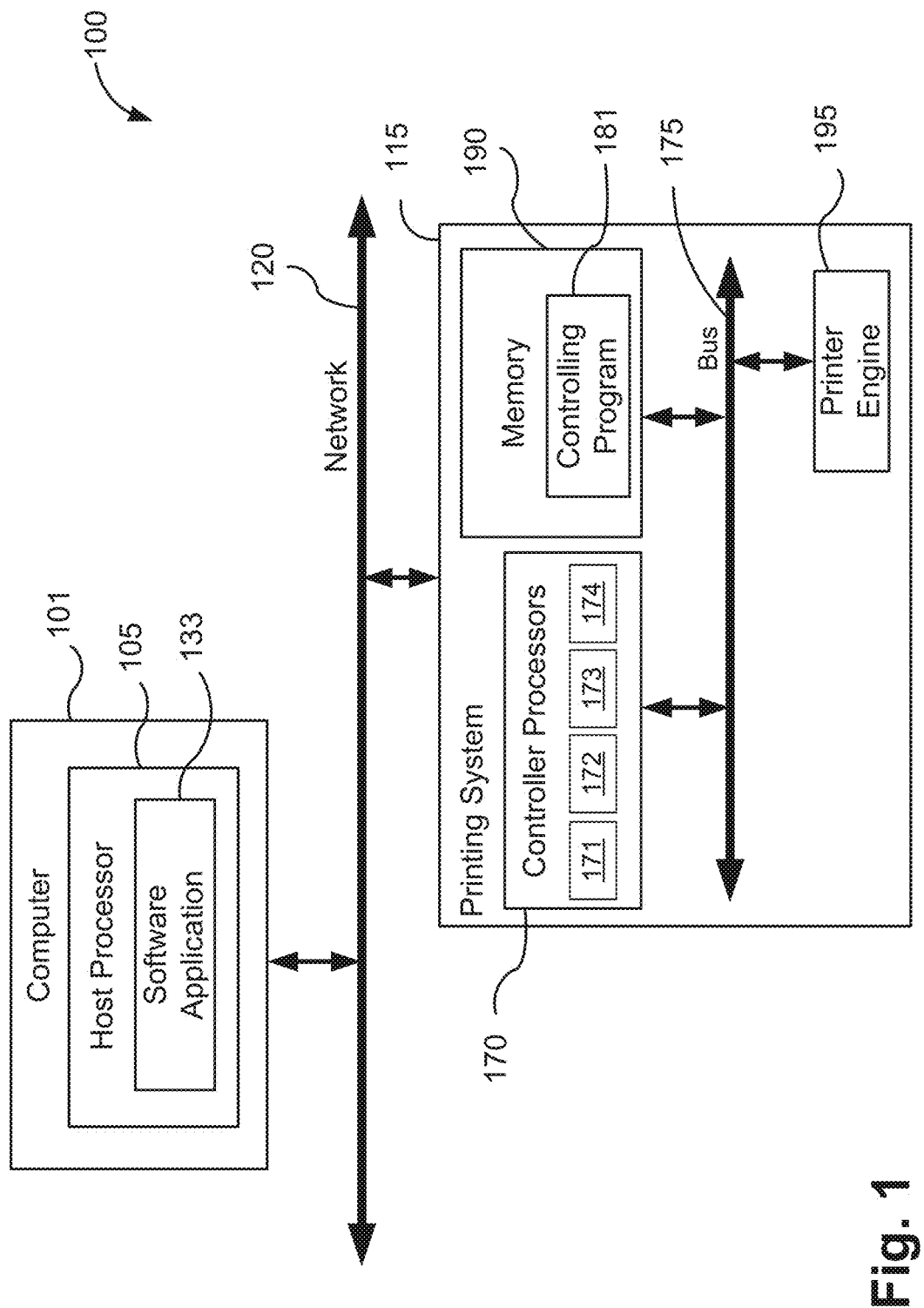
FIG. 1 shows a schematic block diagram of a multi-processor printing system for rendering graphic objects of a page.

Where reference is made in any one or more of the accompanying drawings to steps and/or features, which have the same reference numerals, those steps and/or features have for the purposes of this description the same function(s) or operation(s), unless the contrary intention appears.

FIG. 1 shows a schematic block diagram of a pixel rendering system 100 for rendering graphic objects. The pixel rendering system 100 comprises a computer module 101 connected to a printing system 115 through a communications network 120. The network 120 may be a wide-area network (WAN), such as the Internet, a cellular telecommunications network, or a private WAN. The network 120 may comprise multiple computers. Alternatively, the network 120 may be a single computer module 101 and the printing system 115.

The computer module 101 comprises at least one host processor 105 for executing a software application 133, such as a word processor or graphical software application.

The printing system 115 comprises controller processors 170 which may be referred to as a multi-core controller processor. As shown in FIG. 1, the controller processors 170 comprises four processors 171, 172, 173 and 174, for executing one or more software code modules forming a controlling program 181 which is stored in a memory 190. Alternatively, the controller processors 170 may comprise processors that take the form of single-core CPUs, GPUs, or any other form of computer processor such as field-programmable gate arrays (FPGAs). In another alternative, the controller processors 170 may comprise a mixture of various kinds of the processors described above.

The printing system 115 also has a printer engine 195 coupled to the processors 170, via an interconnected bus 175. The controlling program 181 accepts a printable page produced by a software application 133 and produces pixel data values for printing. The pixel data values may then be stored in memory 190 and reproduced as pixels by the printer engine 195, for example. The controlling program 140 may be executed by the controller processors 170 in one or more threads of execution. A thread consists of a number of instructions or steps that are executed in sequence by one of processors 171-174. The controlling program 181 will be described in detail below with reference to FIGS. 2A and 2B.

Figure 3A:
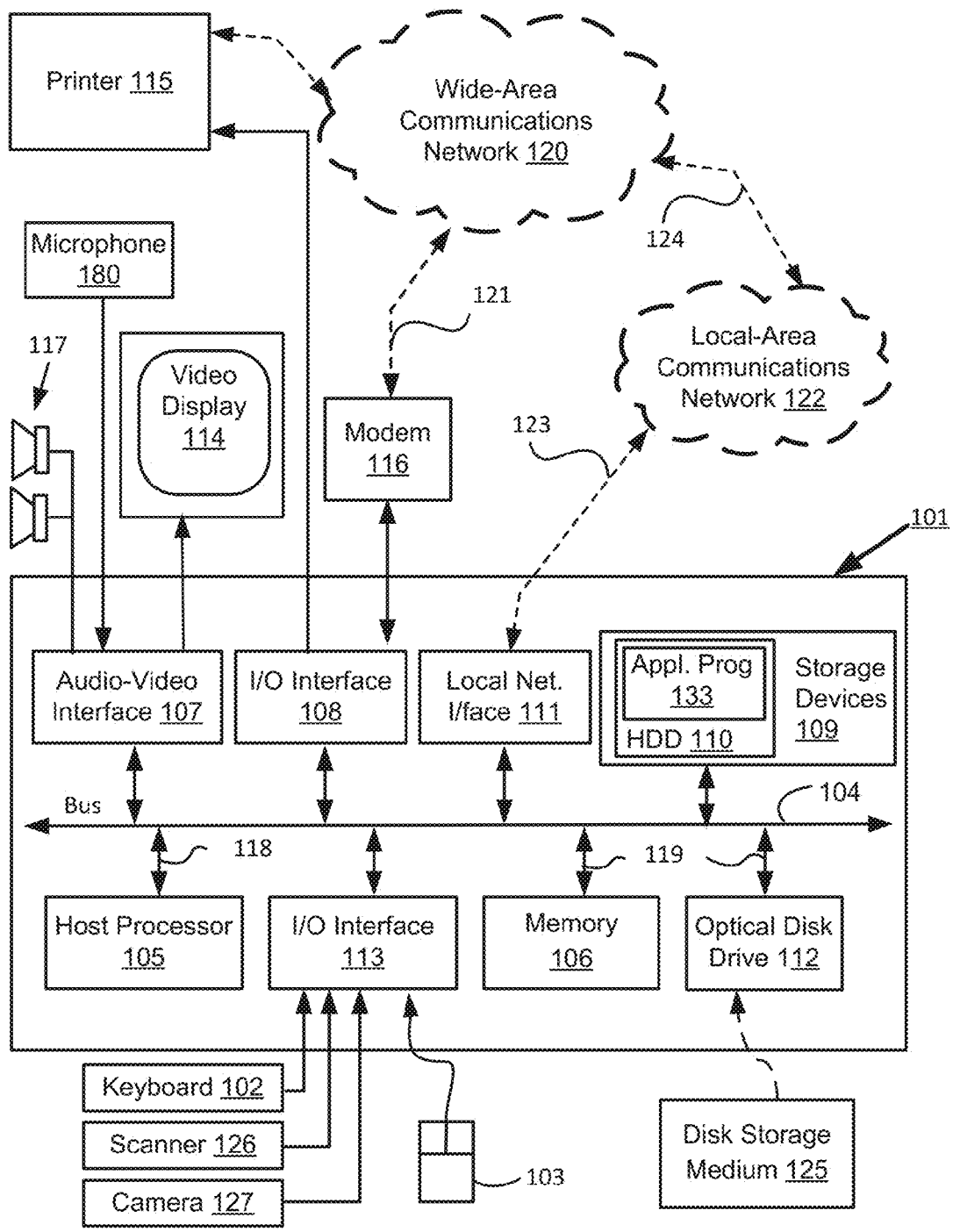
FIGS. 3A and 3B collectively form a schematic block diagram of the general purpose computer system of FIG. 1 in more detail.

As seen in more detail in FIG. 3A, the pixel rendering system 100 includes: the computer module 101; input devices such as a keyboard 102, a mouse pointer device 103, a scanner 126, a camera 127, and a microphone 180; and output devices including the printing system 115, a display device 114 and loudspeakers 117. An external Modulator-Demodulator (Modem) transceiver device 116 may be used by the computer module 101 for communicating to and from the communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes the at least one processor unit 105, and a memory unit 106. For example, the memory unit 106 may have semiconductor random access memory (RAM) and semiconductor read only memory (ROM). The computer module 101 also includes a number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and the printing system 115. In some implementations, the modem 116 may be incorporated within the computer module 101, for example within the interface 108. The computer module 101 also has a local network interface 111, which permits coupling of the computer module 101 via a connection 123 to a local-area communications network 122, known as a Local Area Network (LAN). As illustrated in FIG. 3A, the local communications network 122 may also couple to the wide network 120 via a connection 124, which would typically include a so-called "firewall" device or device of similar functionality. The local network interface 111 may comprise an Ethernet™ circuit card, a Bluetooth™ wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray Disc™) USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or alike computer systems.

Methods described below may be implemented using the system 100 wherein one or more steps of the processes of FIGS. 2B and 4 to 14, to be described, may be implemented as one or more code modules of the software application program 133 executable within the system 100. One or more of the steps of the described methods may be effected by instructions 131 (see FIG. 3B) in the software 133 that are carried out within the system 100.

As also described below, one or more steps of the processes of FIGS. 2B and 4 to 15, to be described, may be implemented as one or more of the code modules forming the controlling program 181 executable within the printing system 115. Again, one or more of the steps of the described methods may be effected by instructions, similar to the instructions 131 in the software 133.

The software instructions 131 implementing the software 133 may be formed as the one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 133 is typically stored in the HDD 110 or the memory 106. The software is loaded into the system 100 from the computer readable medium, and then executed by the system 100. A computer readable medium having such software or computer program recorded on the computer readable medium is a computer program product. The use of the computer program product in the system 100 preferably effects an advantageous apparatus for implementing the described methods.

In some instances, the application programs 133 may be supplied to the user encoded on one or more CD-ROMs 125 and read via the corresponding drive 112, or alternatively may be read by the user from the networks 120 or 122. Still further, the software can also be loaded into the system 100 from other computer readable media. Computer readable storage media refers to any non-transitory tangible storage medium that provides recorded instructions and/or data to the system 100 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application program 133 and the corresponding code modules mentioned above may be executed to implement one or more graphical user interfaces (GUIs) to be rendered or otherwise represented upon the display 114. Through manipulation of typically the keyboard 102 and the mouse 103, a user of the system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

Figure 3B:
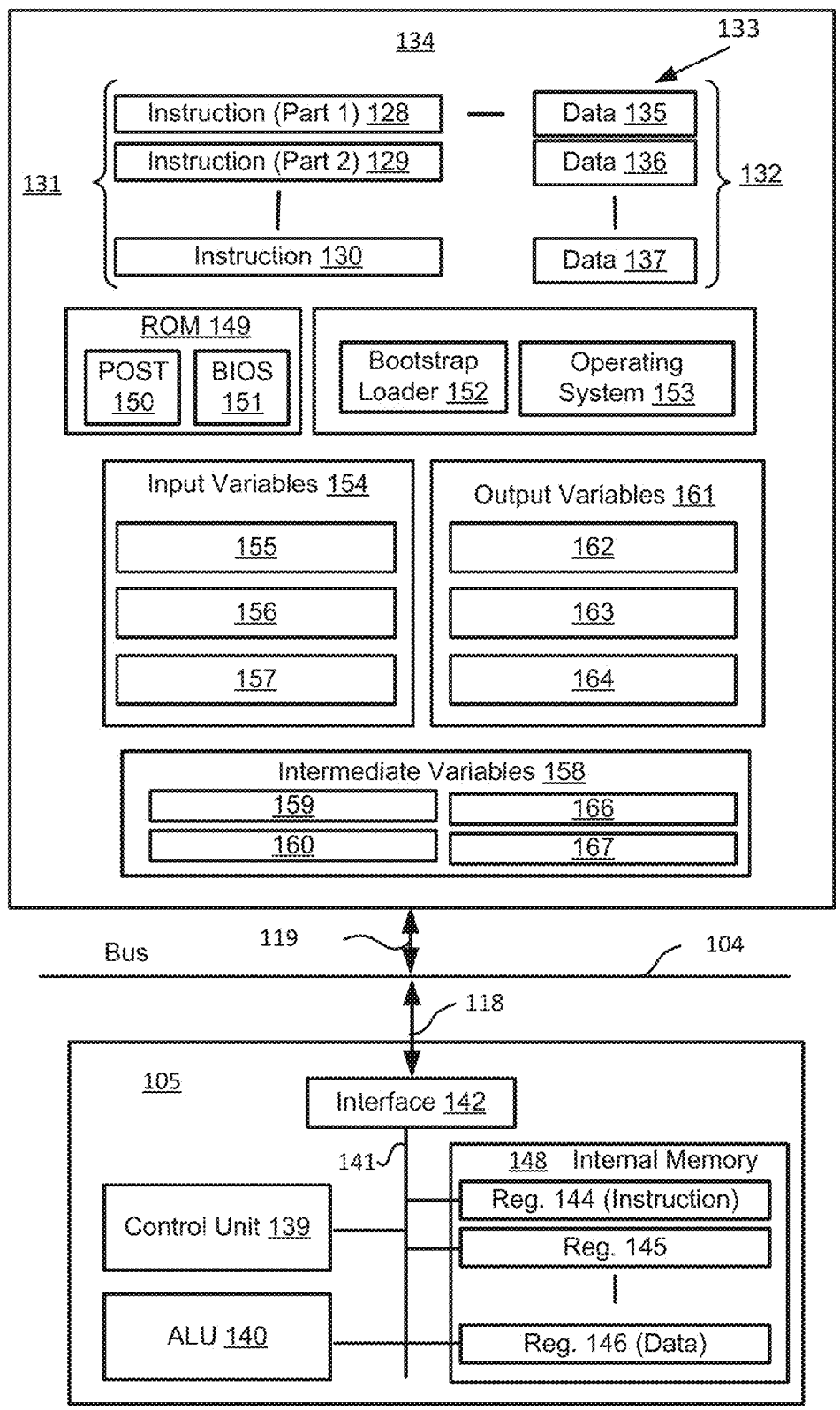

FIG. 3B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 3A.

When the computer module 101 is initially powered up, a power-on self-test (POST) program 150 executes. The POST program 150 is typically stored in a ROM 149 of the semiconductor memory 106 of FIG. 3A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 3A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfill various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 3A need to be used properly so that each process can run effectively. Accordingly, the aggregated memory 134 is not intended to illustrate how particular segments of memory are allocated (unless otherwise stated), but rather to provide a general view of the memory accessible by the system 100 and how such is used.

As shown in FIG. 3B, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 3A. The execution of a set of the instructions may in some cases result in output of data. Execution may also involve storing data or variables to the memory 134.

The methods described below may use input variables 154, which are stored in the memory 134 in corresponding memory locations 155, 156, 157. The disclosed methods produce output variables 161, which are stored in the memory 134 in corresponding memory locations 162, 163, 164. Intermediate variables 158 may be stored in memory locations 159, 160, 166 and 167.

Referring to the processor 105 of FIG. 3B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

(a) a fetch operation, which fetches or reads an instruction 131 from a memory location 128, 129, 130;

(b) a decode operation in which the control unit 139 determines which instruction has been fetched; and (c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

One or more steps or sub-processes in the processes of FIGS. 2 and 4 to 14 may be associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

As described above, one or more steps of the processes of FIGS. 2 and 4 to 14, to be described, may be implemented as one or more code modules of the controlling program 181 executable within the printing system 115. The code modules forming the controlling program 181 are typically stored in the memory 190. The code modules forming the controlling program module 181 may be loaded into the printing system 115 from the computer readable medium, and then executed by the printing system 115. A computer readable medium having such software or computer program recorded on the computer readable medium is a computer program product. The use of the computer program product in the printing system 115 preferably effects an advantageous apparatus for implementing one or more steps of the described methods.

In some instances, the controlling program 181 may be supplied to the user encoded on one or more CD-ROMs, similar to the CD-ROMs 125, or alternatively may be read by the user from the networks 120 or 122. Still further, software code modules for the controlling program 181 may also be loaded into the system 100 from other computer readable media.

The code modules implementing the controlling program 181 may be executed by the processors 170 in a similar manner to the code modules implementing the software application program 133 as described above.

The described methods may alternatively be implemented in dedicated hardware such as one or more integrated circuits performing the functions or sub functions of the described methods. Such dedicated hardware may include graphic processors, digital signal processors, or one or more microprocessors and associated memories.

Figure 2A:
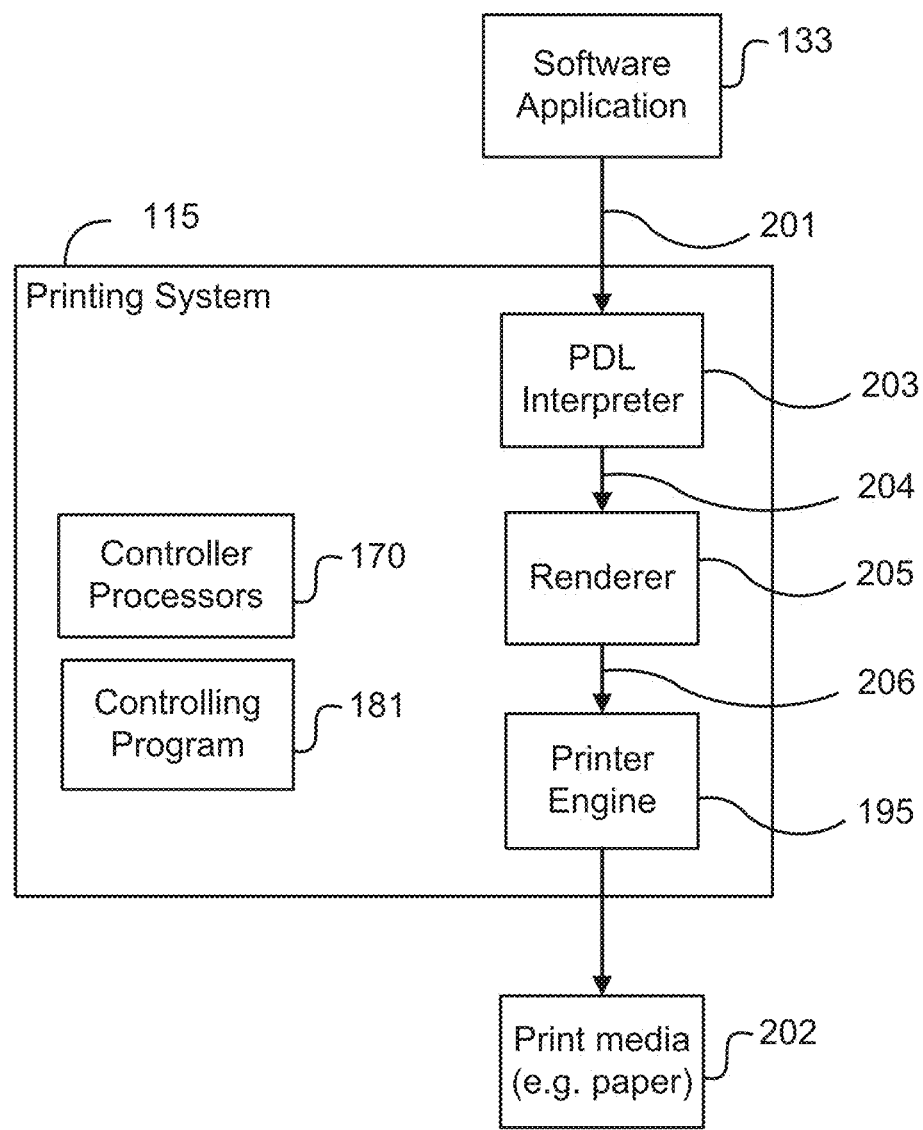
FIG. 2A shows a software application for the printing system of FIG. 1.

FIG. 2A shows a software architecture for printing a printable page description 201 using the printing system 115. Each of the modules 203 and 205 described below may be formed by one or more of the code modules of the controlling program 181.

The software application 133, for example, executing on the computer module 101, provides the printable page description 201 to the printing system 115 for printing to a print medium 202, such as a paper sheet. The printable page description 201 is typically provided in the form of a page description to be printed, the page description being specified using a Page Description Language (PDL), such as Adobe® PDF or Hewlett-Packard® PCL. The PDL provides descriptions of graphic objects to be rendered onto the print media in a rendering (or z) order (or "drawing order"), as opposed to a raster image (i.e. a bitmap of pixel values) of the page to be printed. The printable page description 201 may be the whole or part of a print job created by the software application 133 executing in the computer module 101. Graphic objects in the printable page description 201 described using PDL are typically input from bottom to top in z-order perpendicular to a plane of the page to be printed. In the present specification, 'z' indicates a direction perpendicular to a plane (surface) of the page to be printed.

In the printing system 115, a PDL interpreter module 203 receives the printable page description 201 and generates representations of graphic objects 204 to be printed. The printing system 115 then uses a renderer module 205 to render the graphic objects 204 to a raster image representation 206 comprising pixel data. The raster image representation 206 is printed on the print medium 202, such as paper, using a printer engine module 195. The printer engine 195 may, for example, be an electro-photographic engine.

The PDL interpreter module 203 and renderer module 205 are typically executed by the controlling program 181 which is executed by the controller processors 170 within the printing system 115. The PDL interpreter module 203 and renderer module 205 may be implemented as one or more code modules of the controlling program 181. The renderer module 205 will be described in more detail below with reference to FIG. 2B.

Figure 2B:
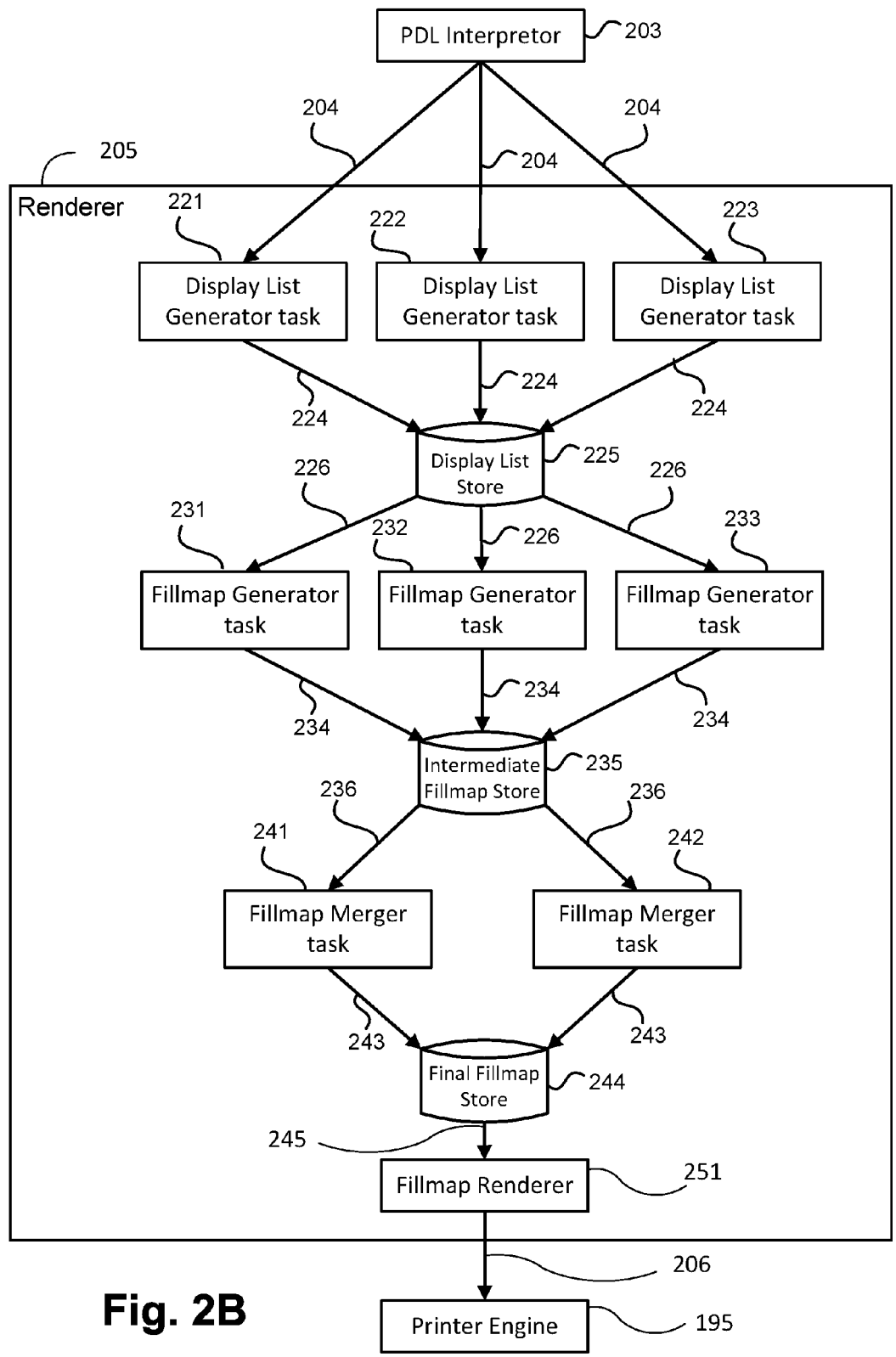
FIG. 2B shows the renderer module of the printing system of FIG. 1.

FIG. 2B shows the renderer module 205 of the printing system 115 in more detail. The renderer module 205 may be used for rendering graphic objects. As described above, the renderer module 205 may be implemented as one or more code modules of the controlling program 181 resident within the memory 190 and being controlled in its execution by the processors 170.

The PDL interpreter module 203 receives a print job via the network 120. As described above, the print job comprises the printable page description 201. As also described above, the printable page description 201 is typically provided in the form of a description of the printable page, the description being specified using a Page Description Language (PDL), such as Adobe® PDF or Hewlett-Packard® PCL. The PDL interpreter module 203 processes the printable page description of the print job into graphic objects 204 for each page to be printed. The graphic objects are passed to display list generator task modules 221-223 which execute display list generator tasks. The tasks executed by the display list generator task modules 221-223 divide the graphic objects 204 into groups before decomposing the groups of objects into display lists 224 consisting of edges, levels and fills (a first set of primitives). The display lists 224 are then passed via bus 175 to be stored in display list store 225 configured within a part of the memory 190. Any suitable method may be used to divide the graphic objects 204 into groups. For example, one method divides graphic objects based on a predetermined number of objects. Another method divides graphic objects based on utilization of worker threads described below.

Fillmap generator task modules 231-233 execute fillmap generator tasks as part of the controlling program 181 on the processors 170 to create "intermediate fillmaps" 234 for each display list 226 stored in display list store 225. Each intermediate fillmap is an intermediate representation of graphic objects within a display list 226 corresponding to the intermediate fillmap. Each of the intermediate fillmaps may therefore be referred to as an "intermediate representation". The intermediate fillmaps 234 are then passed via bus 175 to be stored in intermediate fillmap store 235 configured within a part of memory 190. All intermediate fillmaps 234 associated with a page to be printed are stored in the intermediate fillmap store 235.

Fillmap merger task modules 241-242 execute fillmap merger tasks for fetching the intermediate fillmaps 236 from the intermediate fillmap store 235 via bus 175 and merging the fetched intermediate fillmaps 236 into "final fillmaps" 243. A final fillmap 243 is a representation of all graphic objects on the page to be printed. Each final fillmap 243 may be referred to as a "merged intermediate representation". Merging all intermediate fillmaps associated with the page ensures obscured objects are not processed during rendering. The fillmap merger task modules 241-242 send the final fillmaps 243 via bus 175 to memory 190 to be stored in the final fillmap store 244, ready for rendering by fillmap renderer module 251.

The fillmap renderer module 251 fetches a final fillmap 1 from the final fillmap store 244 and renders the final fillmap 245 to a raster image representation 206 comprising pixel data. The printer engine module 195 then prints the raster image representation 206 to the print medium 202.

In an alternative arrangement, the controlling program 181 may execute the fillmap merger tasks using the fillmap merger task modules 241-242 when there is a plurality of intermediate fillmaps in intermediate fillmap store 235. When the fillmap merger tasks are executed before all intermediate fillmaps associated with a page to be printed are stored, the merged result may be stored back into the intermediate fillmap store 225 as an intermediate fillmap, replacing the merged intermediate fillmaps. Such an alternative arrangement will use less memory 190 to store intermediate fillmaps at the expense of potentially merging graphic objects that will be obscured by another intermediate fillmap with higher z-order.

As described earlier with reference to FIG. 2A, the controlling program 181, and therefore the renderer module 205, may be executed on the multi-core controller processors 170. The tasks executed by the task modules 221-223, 231-233, 241-242 and 251 of the renderer module 205 may therefore be executed in parallel on the processor cores 171-174 of the multi-core controller processors 170. Accordingly, one or more steps of the described methods may be executed in parallel. While many of the tasks are able to execute in parallel, there are some dependencies between tasks that need to be satisfied before certain tasks can begin. For example, because the printable page description 201 is interpreted in z-order, display list generator tasks executed by the display list generator task modules 221-223 are not able to execute in parallel, so their execution is sequential. Fillmap generation tasks executed by the Fillmap generation task modules 231-233 are able to execute in parallel with all other tasks, but require a display list to have been produced as input by a display list generation task. Similarly, fillmap merger tasks executed by the task modules 241-242 are able to execute in parallel with all other tasks, but require two or more intermediate fillmaps to have been already produced by fillmap generation tasks or other fillmap merger tasks.

Operation of the printing system 115 is similar to that of the computer module 101 in terms of storage and execution of the controlling program 181 by the memory 190 and the controller processors 170 respectively. However, the controlling program 181 is multi-threaded with distinct program threads executing on corresponding ones of the multiple processors 171-174 making up the controller processors 170. As such, the foregoing description of the computer module 110 is generally applicable to the printing system 115. Specifically, the controlling program 181 is typically stored within memory 190. The memory 190 may comprise a hard disc drive or semiconductor hard drive. The memory 190 may also have semiconductor random access memory (RAM) and semiconductor read only memory (ROM). Further, the program 181 may be loaded via an interface connection (e.g., a USB port) or via the network 120.

Returning to FIG. 1, in the pixel rendering system 100, the software application 133 creates printable pages for printing, such as printable page 201. The printable page description 201 often contains representations of graphic objects such as text, lines, fill regions, and image data. The software application 133 sends a high-level description of the printable page (e.g., a PDL file) via the network 120 to the controlling program 181 that is executed in the controller processors 170 of the printing system 115. The printable page description 201 contains all information required by the pixel rendering system 100 to render and print the page.

In alternative arrangements, the printing system 115, the controller processors 170 and controlling program 181, may be resident in separate servers connected to the network 120. In still another alternative arrangement, the printing system 115, the controller processors 170 and controlling program 181 may be resident in a distributed network of servers. In such systems, the raster image representation produced by the controlling program 181 is sent to the printer engine module 195 via a network rather than the bus 175.

The printing system 115 and renderer module 205 will now be further described by way of example with reference to FIGS. 4 to 8.

Figure 4:
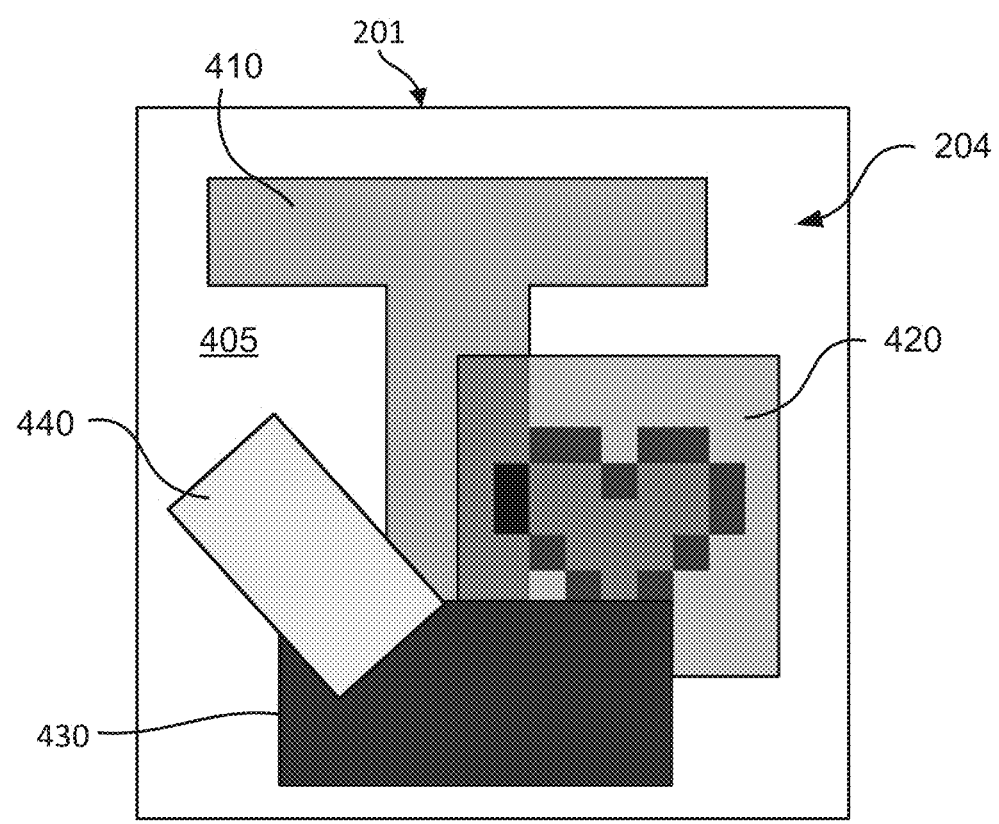
FIG. 4 shows an example of graphic objects in a page description language (PDL) printable page description.

FIG. 4 shows a representation of the printable page description 201 according to one example. The page description 201 of FIG. 4 comprises a white background 405 and four graphic objects 204. The page description 201 may be specified by a PDL. The graphic objects 204 include a fill path 410 with a grey flat fill, a square 420 with a bitmap fill, a rectangle 430 with dark grey flat fill and a rectangle 440 with a light grey flat fill. The square 420 is semi-transparent and has a higher priority than the fill path 410. In addition, the square 420 partially overlaps the fill path 410. The rectangle 430 has a higher priority than the square 420 and partially overlaps the fill path 410 and the square 420. The fill of the rectangle 430 is opaque. Finally, the rectangle 440 has higher priority than the rectangle 430 and partially overlaps the fill path 410 and the rectangle 430. The fill of the rectangle 440 is opaque.

Figure 5A:
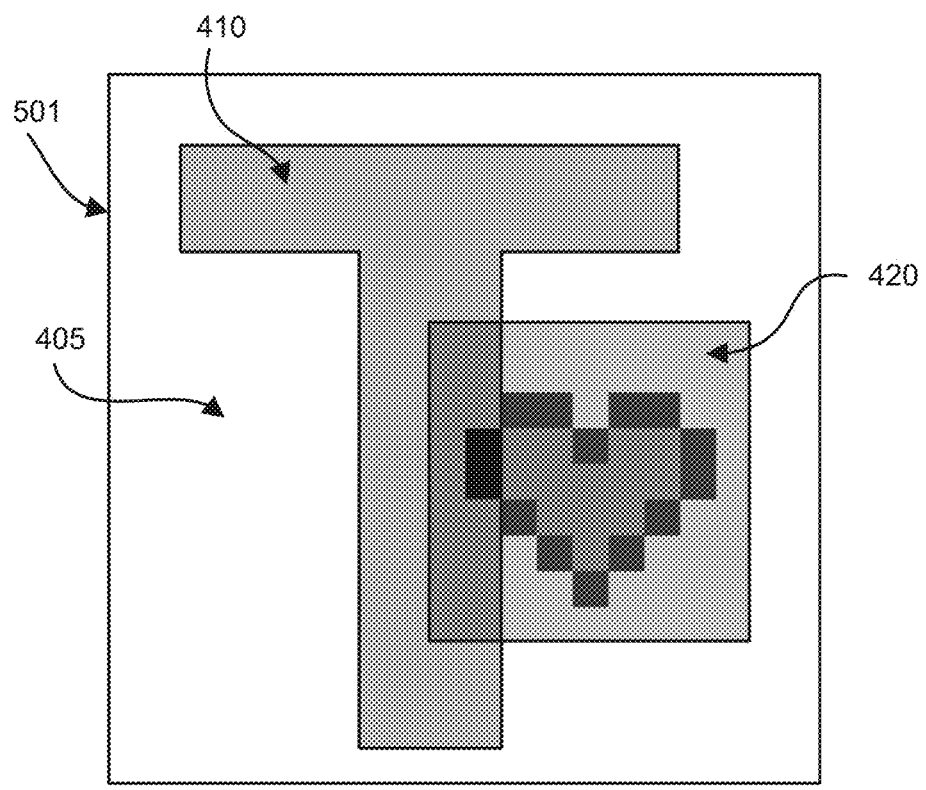
FIG. 5A shows a first group of objects in the printable page description of FIG. 4.
Figure 6A:
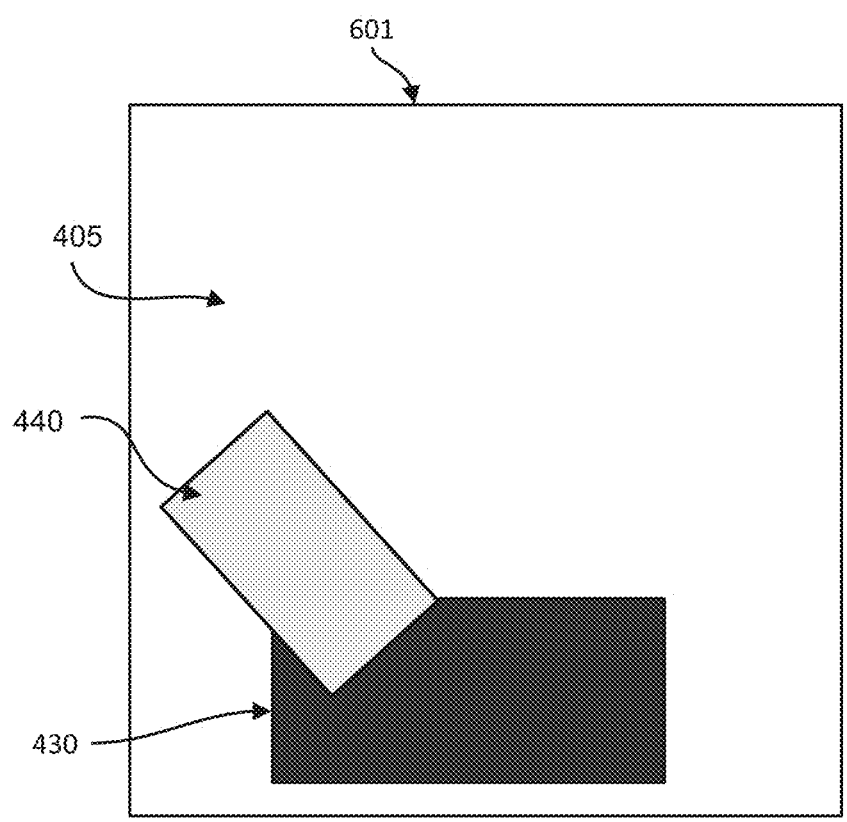
FIG. 6A shows a second group of objects in the printable page description of FIG. 4.

The display list generator task module 221-223, upon receiving the graphic objects 204 from the PDL interpreter module 203, groups the graphic objects 204 into groups. Each group contains one or more of the graphic objects 204 with consecutive priorities (i.e., z-orders perpendicular to an image plane). FIGS. 5A and 6A show an example how the graphic objects 204 in the page description 201 may be split into two groups, a first group 501 and a second group 601, according to drawing order (the z-order). The first group 501 shown in FIG. 5A contains the fill path 410 and the square 420 which are adjacent to each other according to z-order. The second group 601 shown in FIG. 6A contains the rectangle 430 and the rectangle 440 which are adjacent to each other according to z-order.

Figures 5B, 5C:
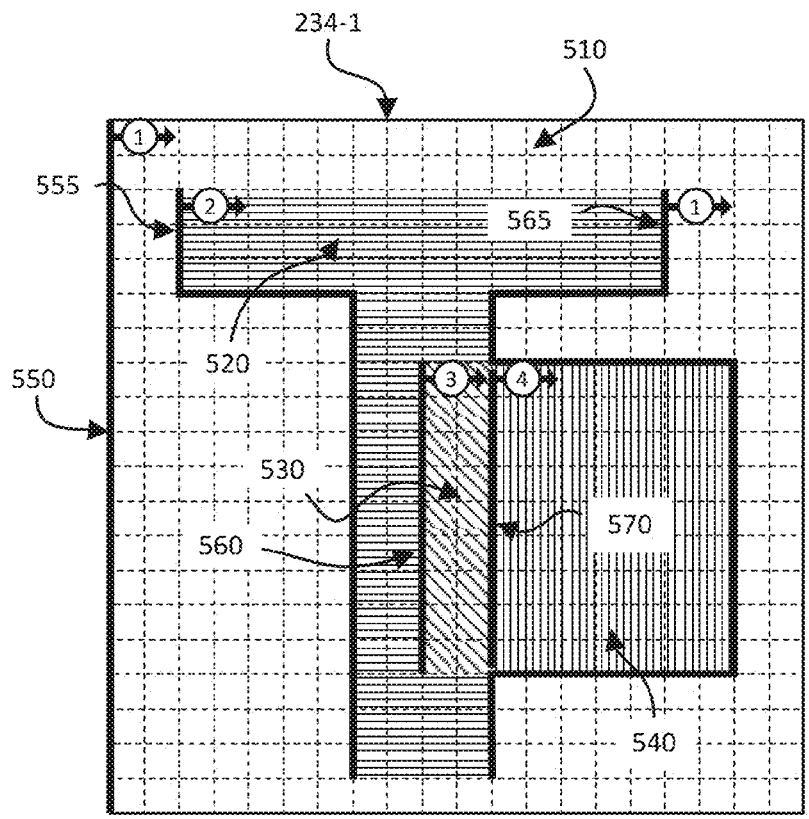
FIG. 5B shows a fillmap for the group of objects shown in FIG. 5A.
FIG. 5C shows a table of known fill compositing sequences corresponding to the fillmap of FIG. 5B.

FIG. 5B shows a first intermediate fillmap 234-1 generated from the group of objects shown in FIG. 5A. The first intermediate fillmap 234-1 is example of one of the intermediate fillmaps 234 described above with reference to FIG. 2B. In FIG. 5B, the background 405, the fill path 410 and square 420 are decomposed into fillmap edges 550, 555, 560, 565, and 570. The fillmap edges 550, 555, 560, 565, and 570 divide the fillmap 234-1 into several regions 510, 520, 530, and 540. Each region corresponds to a fill compositing sequence which is derived from the object group 501 in FIG. 5A. A region is a group of adjoining pixels with the same fill compositing sequence. One or more fillmap edges which intersect a region activate the region when processing the fillmap 234-1 from left to right. For example, region 510 is activated by fillmap edges 550 and 565.

The first region 510 in the fillmap 234-1 corresponds to the white background 405 in the group 501 shown in FIG. 5A. The region 510 is activated by fillmap edges 550 and 565. The set of pixels in a raster image which corresponds to the region 510 derive their colour from the fill compositing sequence corresponding to the region 510. The fill compositing sequence corresponding to the region 510 is the compositing sequence with a single level corresponding to the white background 405 in the group 501 shown in FIG. 5A. The fill compositing sequence corresponding to the region 510 is stored at index 1 in a table of known fill compositing sequences 580 as shown in FIG. 5C. The fill compositing sequence has information about colours and transparency to be composited. The fillmap edges 550 and 565 which activate the region 510 contain a fill compositing sequence index (fill index) with a value set to one (1) (as shown by the arrow numbered "1"). The fill index is the index of the fill compositing sequence with a single level corresponding to the white background 405, within the table of fill compositing sequences 580.

The second region 520 in the fillmap 234-1 corresponds to the fill path 410 with grey flat fill. The region 520 is activated by the fillmap edge 555. The set of pixels in a raster image which correspond to the region 520 derive their colour from the fill compositing sequence corresponding to the region 520. The fill compositing sequence corresponding to the region 520 is the fill compositing sequence with a single level corresponding to the fill path 410 with a grey flat fill. The fill compositing sequence corresponding to the fill path 410 with a grey flat fill is stored at index 2 in the table of fill compositing sequences 580. The fillmap edge 555 which activates the region 520 contains a fill index with a value set to two (2). The fill index with a value set to two (2) is the index of the compositing sequence with a single level, corresponding to the fill path 410 with the grey flat fill. The compositing sequence corresponding to the fill path 410 with the grey flat fill is stored within the table of compositing sequences 580 as shown in FIG. 5C.

The third region 530 in the fillmap 234-1 corresponds to the region of overlap between the fill path 410 with the grey flat fill and the square 420 with the semi-transparent bitmap fill. The region 530 is activated by the fillmap edge 560. The set of pixels which correspond to the region 530 derive their colour from the fill compositing sequence corresponding to the region 530. The fill compositing sequence corresponding to the region 530 is the compositing sequence with two levels. The fill compositing sequence corresponding to the region 530 may be used to render the adjacent graphic objects 410 and 420 that intersect the region 530. The topmost level of the two levels corresponds to the square 420 with the semi-transparent bitmap fill and the bottommost level corresponds to the fill path 410 with the grey flat fill. The fill compositing sequence corresponding to the region 530 is stored at index 3 in the table of compositing sequences 580 as shown in FIG. 5C.

The fillmap edge 560 which activates the region 530 contains a fill index with a value set to three (3), which is the index of the compositing sequence with two levels, within the table of compositing sequences 580. In this instance, the topmost level corresponds to the square 420 with the semi-transparent bitmap fill and the bottommost level corresponds to the fill path 410 with the grey flat fill.

The fourth region 540 in the fillmap 234-1 corresponds to the region of overlap between the square 420 with the semi-transparent bitmap fill and the white background 405. The region 540 is activated by the fillmap edge 570. The set of pixels which correspond to this region 540 derive their colour from the fills corresponding to the region 540.

The fill compositing sequence corresponding to the region 540 is the fill compositing sequence with two levels, where the topmost level corresponds to the square 420 with the semi-transparent bitmap fill and the bottommost level corresponds to the white background 405. The fill compositing sequence corresponding to the region 540 is stored at index 4 in the table of fill compositing sequences 580 as shown in FIG. 5C. The fillmap edge 570 which activates the region 540 contains a fill index with a value set to four (4)), which is the index of the fill compositing sequence with two levels, within the table of compositing sequences 580. In this instance, the topmost level corresponds to the square 420 with the semi-transparent bitmap fill and the bottommost level corresponds to the white background 405.

Any suitable method may be used for generating the fillmap 234-1 from the first group of objects 501 in FIG. 5A. After the fillmap 234-1 has been generated, the fillmap 234-1 may be merged with other fillmaps.

Figure 6B:
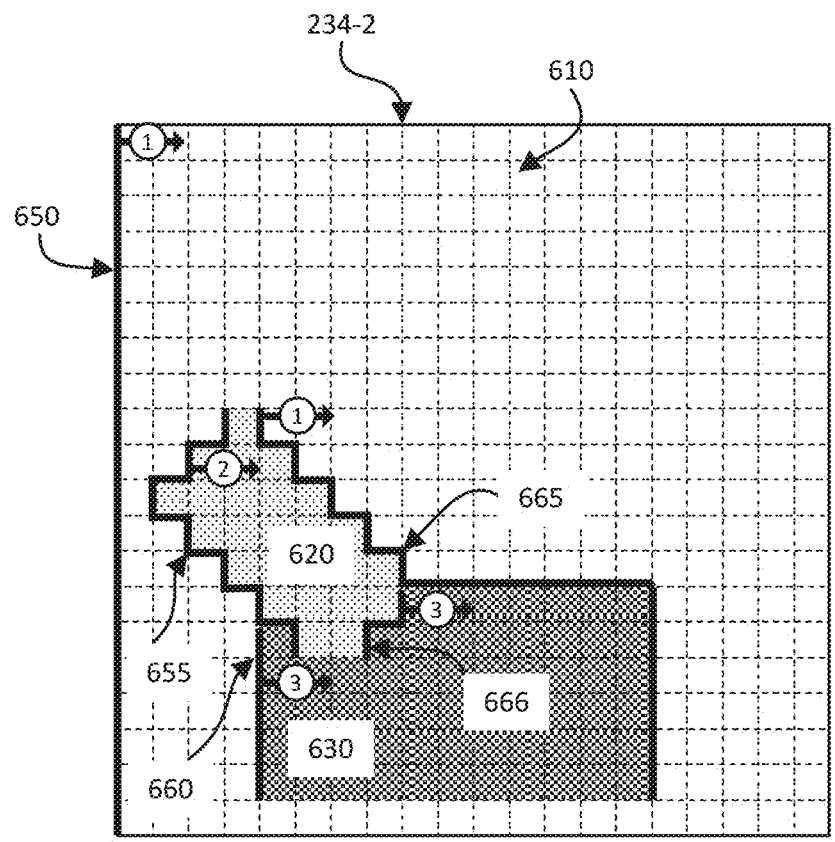
FIG. 6B shows the fillmap representation of the group of objects shown in FIG. 6A.

FIG. 6B shows a fillmap 234-2 generated from the group of objects 601 shown in FIG. 6A. The first intermediate fillmap 234-2 is an example of one of the intermediate fillmaps 234 described above with reference to FIG. 2B. In FIG. 6B, the background 405, the rectangle 430 and the rectangle 440 are decomposed into fillmap edges 650, 655, 660, 665 and 666. The fillmap edges 650, 655, 660, 665 and 666 divide the fillmap representation 234-2 into several regions 610, 620 and 630. Each region 610, 620 and 630 corresponds to a fill compositing sequence which is derived from the object group 601 in FIG. 6A.

Figure 6C:
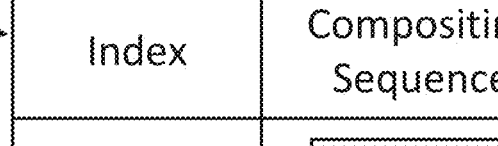
FIG. 6C shows a table of known fill compositing sequences corresponding to the fillmap of FIG. 6B.

The first region 610 in the fillmap 234-2 corresponds to the white background 405 in the group of objects 601 shown in FIG. 6A. The region 610 is activated by fillmap edges 650 and 665. The set of pixels in a raster image which correspond to the region 610 derive their colour from the fill compositing sequence corresponding to the region 610. The fill compositing sequence corresponding to the region 610 is the compositing sequence with a single level corresponding to the white background 405 in the group of objects 601 shown in FIG. 6A. The fill compositing sequence corresponding to the region 610 is stored at index 1 in the table of known fill compositing sequences 680 as seen in FIG. 6C. The fillmap edges 650 and 665 which activate the region 610 contain a fill compositing sequence index (fill index) with a value set to 1(shown by the arrow numbered "1"). The fill index for the edges 650 and 665 is the index of the fill compositing sequence with a single level corresponding to the white background 405, within the table of fill compositing sequences 680 as seen in FIG. 6C.

The second region 620 in the fillmap 234-2 corresponds to the fill path 440 with light grey flat fill. The region 620 is activated by the fillmap edge 655. The set of pixels in the raster image which correspond to the region 620 derive their colour from the fill compositing sequence corresponding to the region 620. The fill compositing sequence corresponding to the region 620 is the fill compositing sequence with a single level corresponding to the fill path 440 with a light grey flat fill. The fill compositing sequence corresponding to the region 620 is stored at index 2 in the table of fill compositing sequences 680 as seen in FIG. 6C. The fillmap edge 655 which activates the region 620 contains a fill index with a value set to two (2). The fill index for the fillmap edge 655 is the index of the compositing sequence with a single level corresponding to the fill path 440 with the light grey flat fill, within the table of compositing sequences 680.

The third region 630 in the fillmap 234-2 corresponds to the dark grey flat fill of the rectangle 430. The region 630 is activated by the fillmap edges 660 and 666. The set of pixels which correspond to the region 630 derive their colour from the fill compositing sequence corresponding to the region 630. The fill compositing sequence corresponding to the region 630 is the compositing sequence with one level corresponding to the dark grey fill. The fill compositing sequence corresponding to the region 630 is stored at index three (3) in the table of compositing sequences 680 as seen in FIG. 6C. The fillmap edges 660 and 666 which activate the region 630 contain a fill index with a value set to three (3). The fill index for the fillmap edges 660 and 666 is the index of the compositing sequence with a single level corresponding to the fill path 430 with the dark grey flat fill, within the table of compositing sequences 680 as seen in FIG. 6C.

Figures 7A, 7B:
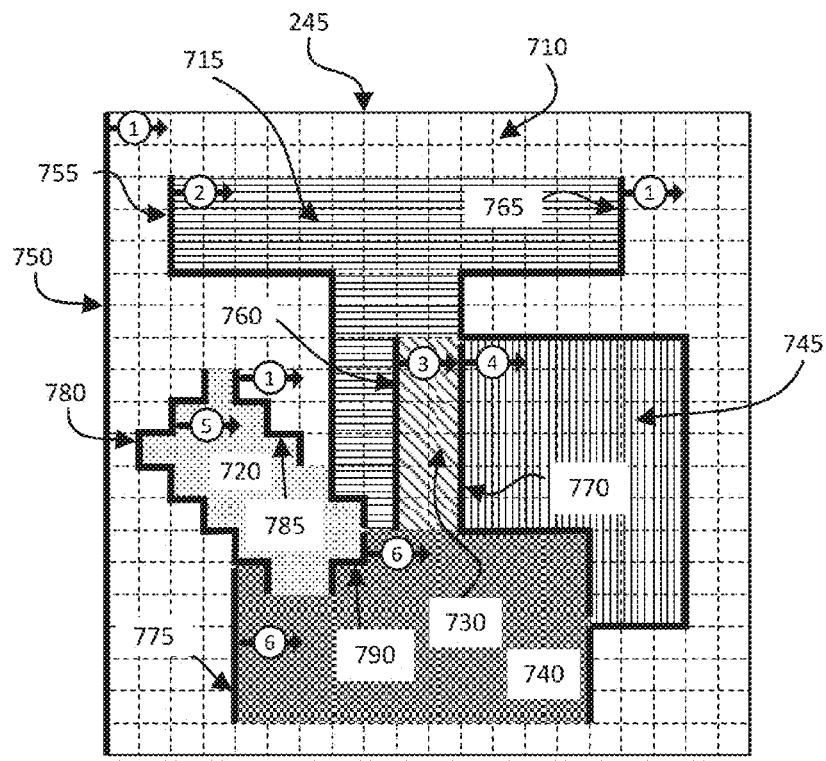
FIG. 7A shows a fillmap which is the result of merging the fillmaps shown in FIGS. 5B and 6B.
FIG. 7B shows a table of known fill compositing sequences corresponding to the fillmap of FIG. 7B.

FIG. 7A shows a final fillmap 245 of the printable page description 201 shown in FIG. 4, obtained from fillmaps 234-1 and 234-2 by the process of fillmap merging executed by a fillmap merger task module 241-242. The fillmap 245 is an example of the final fillmap 245 described above with reference to FIG. 2B. The merged final fillmap 245 is the result of merging fillmaps 234-1 and 234-2. FIG. 7B shows a table of compositing sequences 795 resulting from merging the tables of compositing sequences 580 and 680. The fillmaps 234-1 and 234-2 are merged into edges 750, 755, 760, 770, 780, 785, 790, 775 and 765 that divide the final fillmap 245 into regions 710, 715, 730, 720, 740 and 745. The resulting fill compositing sequence table 795 is the result of merging the fill compositing sequence tables 580 and 680. The merging of the fillmaps such as 234-1 and 234-2 and tables of fill compositing sequences such as 580 and 680 will be described later, with reference to FIGS. 8A to 8D.

Edge 750 comes from merging edges 550 and 650. Edge 750 activates the region 710. The set of pixels in a raster image which correspond to the region 710 derive their colour from the fill compositing sequence index (fill index) with a value set to 1 (shown by the arrow numbered "1") in the resultant table of fill compositing sequences 795.

Edge 755 comes from merging parts of edges 555 and 665. Edge 755 activates the region 715. The set of pixels in the raster image which correspond to the region 715 derive their colour from the fill compositing sequence index (fill index) with a value set to two (2) (shown by the arrow numbered "2") in the resultant table of fill compositing sequences 795.

Edge 760 comes from edge 560. Edge 760 activates the region 730. The set of pixels in a raster image which correspond to the region 730 derive their colour from the fill compositing sequence index (fill index) with a value set to three (3) (shown by the arrow numbered "3") in the resultant table of fill compositing sequences 795.

Edge 770 comes from merging parts of edges 570 and 665. Edge 700 activates the region 745. The set of pixels in the raster image which correspond to the region 745 derive their colour from the fill compositing sequence index (fill index) with a value set to four (4) (shown by the arrow numbered "4") in the resultant table of fill compositing sequences 795.

Edge 780 comes from edge 655. Edge 780 activates the region 720. The set of pixels in a raster image which correspond to the region 720 derive their colour from the fill compositing sequence index (fill index) with a value set to five (5) (shown by the arrow numbered "5") in the resultant table of fill compositing sequences 795.

Edge 785 comes from edge 665. Edge 785 activates the region 710. The set of pixels in a raster image which correspond to the region 710 derive their colour from the fill compositing sequence index (fill index) with a value set to one (1) (shown by the arrow numbered "1") in the resultant table of fill compositing sequences 795.

Edge 790 comes from edge 666. Edge 790 activates the region 740. The set of pixels in a raster image which correspond to the region 740 derive their colour from the fill compositing sequence index (fill index) with a value set to six (6) (shown by the arrow numbered "6") in the resultant table of fill compositing sequences 795.

Edge 775 comes from edge 660. Edge 775 activates the region 740. The set of pixels in a raster image which correspond to the region 740 derive their colour from the fill compositing sequence index (fill index) with a value set to six (6) (shown by the arrow numbered "6") in the resultant table of fill compositing sequences 795.

Finally, edge 765 comes from merging parts of edges 565 and 665. Edge 765 activates the region 710. The set of pixels in the raster image which correspond to the region 710 derive their colour from the fill compositing sequence index (fill index) with a value set to one (1) (shown by the arrow numbered "1") in the resultant table of fill compositing sequences 795.

An example of merging two intermediate fillmaps 810 and 820 by a fillmap merger task 241-242, will now be described with respect to FIGS. 8A, 8B, 8C and 8D. The fillmaps 810 and 820 are each an example of one of the intermediate fillmaps 234 described above with reference to FIG. 2B. FIGS. 8A and FIG. 8B show the first three scanlines of the two intermediate fillmaps 810 and 820, respectively, to be merged. FIG. 8C shows the first three scanlines of merged final fillmap 830. FIG. 8D shows a key for interpreting the fillmaps 810, 820 and 830 as shown in FIGS. 8A, 8B and 8C. Again, the final fillmap 830 is an example of one of the final fillmaps 245 described above with reference to FIG. 2B. Each fillmap 810, 820 and 830 consists of a set of edges, such as edge 811. Each edge is associated with a fill compositing sequence such as 861. A compositing sequence may be fully opaque, which means that the compositing sequence does not need a background for compositing and rendering since the bottom fill in the sequence is opaque. Otherwise, the compositing sequence is partially transparent, which means all fills in the compositing sequence are partially transparent.

The intermediate fillmap 810 with the smaller z-level contains two edges—edges 811 and 812—in the first three scanlines of the fillmap 810. Edge 811 is associated with fill compositing sequence 861 that is fully opaque. Edge 812 is associated with fill compositing sequence 862 that is partially transparent.

The intermediate fillmap 820 with the higher z-level contains three (3) edges—edges 821, 822 and 823—in the first three scanlines of the fillmap 820. Edges 821 and 822 are associated with fill compositing sequences 871 and 872, respectively, that are partially transparent. Edge 823 is associated with fill compositing sequence 873 that is fully opaque.

Fillmap merger task modules 241-242 merge fillmaps 810 and 820 into fillmap 830 which also consists of a set of edges, each edge being associated with fill compositing sequence that can be fully opaque or partially transparent.

The area of the fillmaps 810 and 820 is traversed in scanline sequential order, and edges and associated fill compositing sequences of both input fillmaps 810 and 820 are examined Spans of pixels between the edges of the fillmaps 810 and 820 are identified. The fill compositing sequence for each span of the merged fillmap 830 is obtained by combining the fill compositing sequences of the respective one or more spans of the intermediate fillmap 810 and 820 correspondingly positioned in the respective spans of the intermediate fillmap scanlines. For each new compositing sequence, a candidate edge is created within the newly merged fillmap 830 and is associated with one of the input edges. A candidate edge is open and extended to the next scanline, if a "touching" span located on the next scanline has an identical fill compositing sequence. If a candidate edge cannot be extended, it is terminated and becomes an edge in the merged fillmap 830.

Starting at scanline 0, a fillmap merger task module 241-242 starts at new edge 831 as a result of the span started by intermediate fillmap edges 811 and 821 and ended by intermediate fillmap edge 812. Fill compositing sequence 881 of edge 831 is the combination of the respective fill compositing sequences 871 and 861 associated with edges 821 and 811. Fill compositing sequence 881 is fully opaque because compositing sequence 861 is fully opaque. Edge 831 then becomes the candidate edge for edge 821 (which has higher z-level than edge 811), while edge 811 has no candidate edge. Similarly, edge 832 is created and becomes the candidate edge for edge 812, and edge 833 is created and becomes the candidate edge for edge 822. A compositing sequence 882 is created for the span between edge 832 and edge 833. Compositing sequence 882 is the combination of compositing sequences 862 and 871 and is partially transparent because both 862 and 871 are partially transparent. Compositing sequence 883 for the span between edges 833 and the edge of the merged fillmap 830 is the combination of compositing sequences 862 and 872 and is partially transparent because both 862 and 872 are partially transparent. After scanline 0 is processed, merged fillmap candidate edges 831, 832 and 833 are open for extension into the next scanline.

On scanline 1, the span started by intermediate fillmap edges 811 and 821 and ended by edge 823 has candidate edge 831, which references the same merged fill compositing sequence 881 as the span, so open edge 831 is extended and remains the candidate edge for intermediate fillmap edge 821. A new edge 834 is created in response to the span started by intermediate fillmap edge 823 and ended by edge 812. Intermediate fillmap edge 823 then refers to edge 834 as the candidate edge for the fillmap edge 823. The fill compositing sequence 884 is the same as 873, because the higher level fill compositing sequence 873 is fully opaque. The span started by edge 812 and ended by edge 822 refers to the same merged fill compositing sequence as the previous span because edge 823 refers to a fully opaque compositing sequence 873. So the span by edge 812 and ended by edge 822 is joined onto the span associated with edge 834 on scanline 1, and the edge 832 is terminated because the edge 832 can no longer touch any spans on scanline 1. Edge 832 thus becomes an output edge in fillmap 830. Edge 812 no longer has a candidate edge. Finally, the span started by edge 822 extends candidate edge 833, and edge 833 continues to be the candidate edge for edge 822.

On scanline 2, edge 831 is extended in a similar fashion to scanline 1. The span started by edge 822 and ended by edge 812 has edge 833 as a candidate edge. However, the merged fill compositing sequence 885 for the span started by edge 822 and ended by edge 812 does not match that of the candidate edge, nor does the merged fill compositing sequence 885 match the fill compositing sequence of the edge 834 open for extension. As a result, new edge 835 with compositing sequence 885 is created and becomes the candidate edge for edge 822. The compositing sequence 885 is fully opaque because compositing sequence 861 is fully opaque. Since edge 834 can no longer touch subsequent spans on scanline 2, edge 834 is terminated and becomes an output edge in the merged fillmap 830. The next span started by edge 812 does not have a candidate edge. However, the span started by edge 812 can connect to the open edge 833 from scanline 1, because fill compositing sequence 883 matches the compositing sequence of edge 883. So edge 833 is extended to include the span started by edge 812 and becomes the candidate edge for edge 812. If merging fillmap 830 ends at scanline 2, candidate edges 831, 835, 833 are terminated and become output edges in fillmap 830. Otherwise edges 831, 835, 833 are extended to the next scanline.

Figure 9:
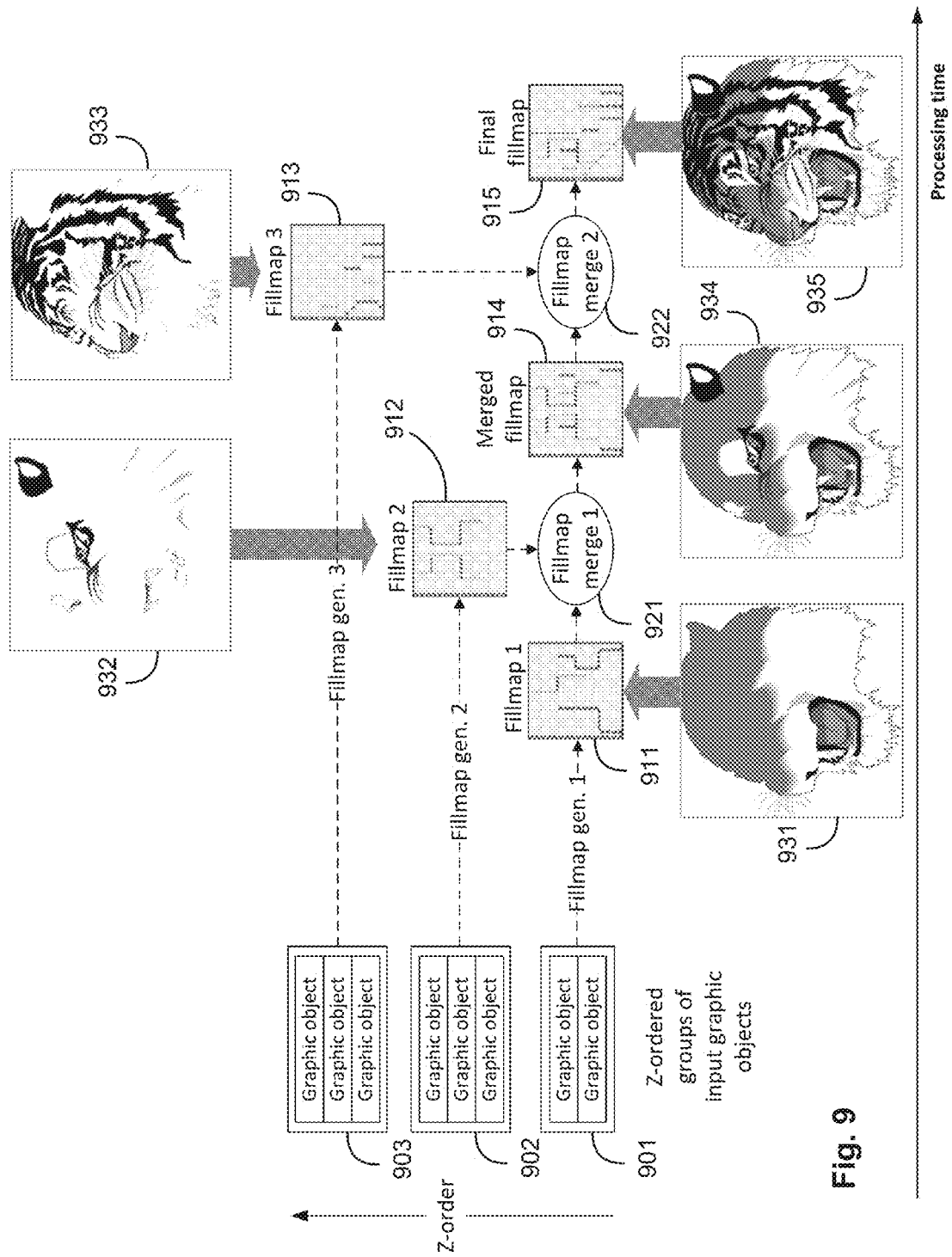
FIG. 9 shows an example of a bottom-up fillmap merging process.

An example of merging intermediate fillmaps according to one arrangement will now be described with reference to FIG. 9. FIG. 9 shows eight graphic objects (referenced as "Graphic object") placed into groups 901-903 according to their z-order. Group 901 contains two graphic objects with lowest z-order. Group 902 contains three graphic objects with next highest z-order. Group 903 contains the remaining three graphic objects with highest z-order. Groups 901, 902 and 903 may be formed according to the number of graphic objects, complexity of graphic objects, or any other suitable method.

Groups 901-903 of the graphic objects are then converted to intermediate fillmap representations 911-913, respectively, by fillmap generation tasks executed, for example, by fillmap generation task modules 231-233. The fillmap generation tasks may be executed in parallel using multiple processors, such as controller processors 170. Images 931-933 show examples of intermediate fillmaps 911-913, respectively, if intermediate fillmaps 911-913 were to be rendered prior to merging.

In the example of FIG. 9, intermediate fillmaps are merged in order of lowest z-order to highest z-order. Fillmap merge 921, executed by a fillmap merger task using, for example, one of fillmap merger task modules 241-242, merges the intermediate fillmap 911 with the lowest z-order with the intermediate fillmap 912 with the next highest z-order. The output of fillmap merge 921 is merged fillmap 914. Merged fillmap 914 is also an intermediate fillmap, as fillmap 914 does not represent all graphic objects. Merged fillmap 914 replaces intermediate fillmaps 911 and 912 as the intermediate fillmap with the lowest z-order. Image 934 shows an example of merged fillmap 934, being a combination of images 931 and 932.

Once intermediate fillmap 913 is complete, intermediate fillmap 913 is merged with merged fillmap 914 using fillmap merge 922. Fillmap merge 922 is executed by a fillmap merger task using, for example, one of fillmap merger tasks 241-242. The output of fillmap merge 922 is merged fillmap 915. Merged fillmap 915 is a final fillmap, as merged fillmap 915 represents all graphic objects. There are no more intermediate fillmaps needing to be merged. Image 935 shows an example of final fillmap 915, being a combination of images 933 and 934.

Figure 10A:
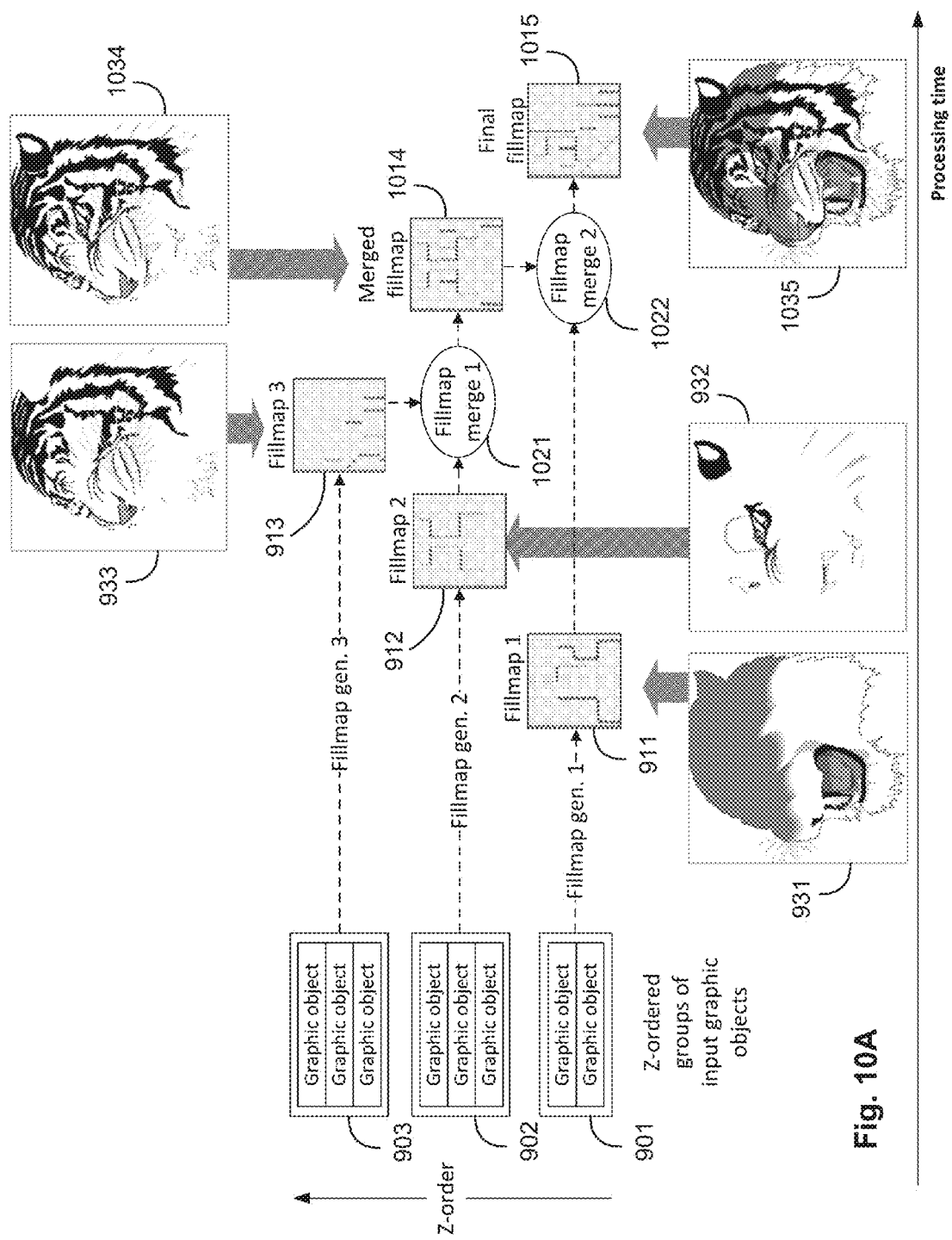
FIG. 10A shows an example of another fillmap merging process.

An example of merging intermediate fillmaps according to another arrangement will now be described with reference to FIG. 10A. FIG. 10A shows eight graphic objects (referenced as "Graphic object") placed into groups 901-903 according to z-order. As with FIG. 9, group 901 contains the two graphic objects with lowest z-order. Group 902 contains three graphic objects with the next highest z-order. Group 903 contains the remaining three graphic objects with the highest z-order. Groups 901, 902 and 903 may be formed according to the number of graphic objects, the complexity of graphic objects, or any other suitable method.

Groups 901-903 of graphic objects are then converted to intermediate fillmap representations 911-913, respectively, by fillmap generation tasks using, for example, fillmap generation task modules 231-233. The fillmap generation tasks may be executed in parallel on multiple processors, such as controller processors 170. Images 931-933 show examples of intermediate fillmaps 911-913, respectively, if intermediate fillmaps 911-913 were to be rendered prior to merging. The fillmap generation process in the example shown in FIG. 10A is the same as the fillmap generation process in the example shown in FIG. 9.

In the arrangement of FIG. 10A, fillmap merging occurs when two or more intermediate fillmaps that are consecutive in z-order (i.e., adjacently located according to z-order) are complete. Fillmap generation tasks executed by fillmap generation task modules 231-233, may finish in orders other than z-order, for example, when the fillmap generation tasks are executed using multiple processors such as controller processors 170. In the example shown in FIG. 10A, the fillmap generation task that produces the intermediate fillmap 911 with the lowest z-order may take a long time, and may finish after the fillmap generation tasks that produce the other intermediate fillmaps 912 and 913. Therefore, intermediate fillmaps 912 and 913 are merged using fillmap merge 1021 to produce merged fillmap 1014. Merged fillmap 1014 is also an intermediate fillmap, as merged fillmap 1014 does not represent all graphic objects. Merged fillmap 1014 replaces intermediate fillmaps 912 and 913 as the intermediate fillmap with the highest z-order. Image 1034 shows an example of merged fillmap 1014, being a combination of images 932 and 933.

Figure 10B:
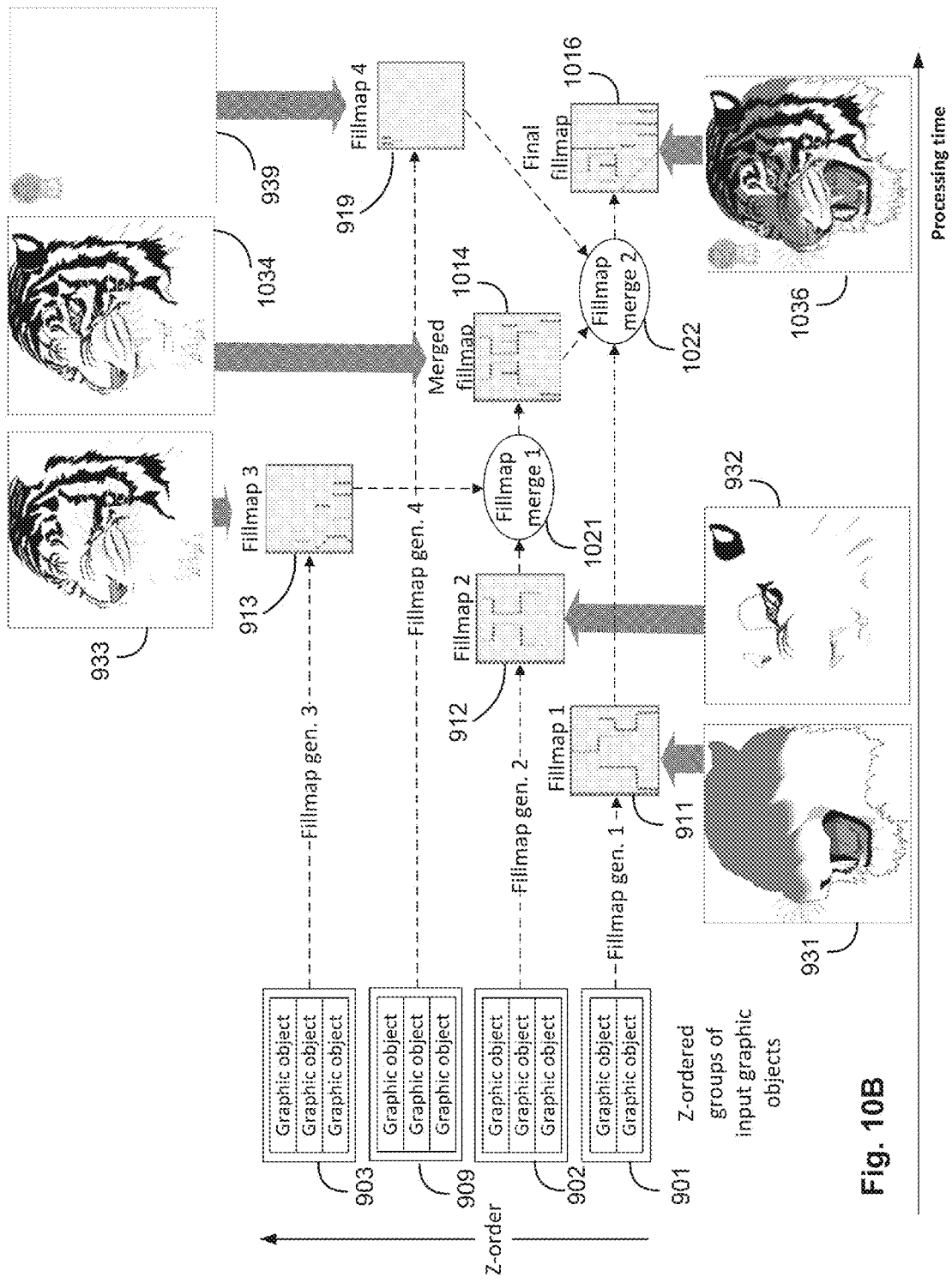
FIG. 10B shows an example of yet another fillmap merging process.

Once intermediate fillmap 911 is complete, fillmap 911 is merged with merged fillmap 1014 using fillmap merge 1022. Fillmap merge 1022 is executed using a fillmap merger task such as one of fillmap merger tasks 241-242. The output of fillmap merge 1022 is merged fillmap 1015. Merged fillmap 1015 is a final fillmap, as fillmap 1015 represents all graphic objects of the groups 901, 902 and 903. There are no more intermediate fillmaps needing to be merged. Image 1035 shows an example of final fillmap 1015, being a combination of images 931 and 1034. The final fillmap 1015 produced in the example of FIG. 10A is identical to final fillmap 915 produced in the example described previously with reference to FIG. 9. An example of merging intermediate fillmaps according to yet another arrangement will now be described with reference to FIG. 10B. FIG. 10B shows eleven graphic objects (referenced as "Graphic object") placed into groups 901, 902, 909 and 903 according to z-order. As with FIG. 9, group 901 contains the two graphic objects with lowest z-order. Group 902 contains three graphic objects with the next highest z-order. Group 903 contains the three graphic objects with the highest z-order. Additionally, group 909 contains the three graphic objects with the z-order in between the z-order of group 902 and z-order of group 903. Groups 901, 902, 909 and 903 may be formed according to the number of graphic objects, the complexity of graphic objects, or any other suitable method.

Groups 901-903 and 909 of graphic objects are then converted to intermediate fillmap representations 911-913 and 919, respectively, by fillmap generation tasks using, for example, fillmap generation task modules 231-233. The fillmap generation tasks may be executed in parallel on multiple processors, such as controller processors 170. Images 931-933 and 939 show examples of intermediate fillmaps 911-913 and 919, respectively, if intermediate fillmaps 911-913 and 919 were to be rendered prior to merging. The fillmap generation process of fillmaps 911-913 in the example shown in FIG. 10B is the same as the fillmap generation process in the example shown in FIG. 10A. In addition, the fillmap 919 is generated from group 909. Groups 901-903 contain objects that are spatially overlapping. However, group 909 contains objects that do not overlap any object from groups 901-903.

In the arrangement of FIG. 10B, fillmap merging occurs when two or more intermediate fillmaps 911-913 that are consecutive in z-order (i.e., adjacently located according to z-order) are complete. However, fillmap 919 which is the result of conversion of group 909 can be merged with other fillmaps in any order because the objects from group 909 do not overlap with any other objects in FIG. 10B. A checking step may be used to determine whether object groups overlap each other. Fillmap generation tasks executed by fillmap generation task modules 231-233, may finish in orders other than z-order. For example, when the fillmap generation tasks are executed using multiple processors corresponding to fillmap generation task modules 231-233 such as controller processors 170, the fillmap generation tasks may finish in an order other than z-order. In the example shown in FIG. 10B, the fillmap generation task that produces the intermediate fillmap 911 with the lowest z-order may take a long time, and may finish after the fillmap generation tasks that produce the other intermediate fillmaps 912 and 913. The fillmap generation task that produces the intermediate fillmap 919 may take a long time and finish after the intermediate fillmaps 912 and 913 have been generated. However intermediate fillmaps 912 and 913 can be merged together, because intermediate fillmap 919 can be merged with other fillmaps in any order. Therefore, intermediate fillmaps 912 and 913 are merged using fillmap merge 1021 to produce merged fillmap 1014. Merged fillmap 1014 is also an intermediate fillmap, as merged fillmap 1014 does not represent all graphic objects. Merged fillmap 1014 replaces intermediate fillmaps 912 and 913 as the intermediate fillmap with the highest z-order. Image 1034 shows an example of the merged fillmap 1014, where the image 1034 represents a combination of images 932 and 933.

Once intermediate fillmap 911 is complete, fillmap 911 is merged with merged fillmap 1014 and intermediate fillmap 919 using fillmap merge 1022. Fillmap merge 1022 is executed using a fillmap merger task such as one of fillmap merger tasks 241-242. The output of fillmap merge 1022 is merged fillmap 1016. Merged fillmap 1016 is a final fillmap, as fillmap 1016 represents all graphic objects of the groups 901, 902, 909 and 903. There are no more intermediate fillmaps needing to be merged in the arrangement of FIG. 10B. Image 1036 shows an example of final fillmap 1016, where the image 1036 represents a combination of images 931, 939 and 1034.

The fillmaps 911-915, 919, and 1014-1016 shown in FIGS. 9, 10A and 10B are simplified for explanation purposes. Therefore, the fillmaps 911-915, 919, and 1014-1016 may not correspond to actual images 931-935 etc.

FIG. 11 is a flow chart of a method 1100 of rendering a fillmap, using the renderer module 205 of FIG. 2B. The method 1100 may be used for determining a merged intermediate representation of a page to be printed (or rendered) by merging intermediate representations of the page. The method 1100 may be executed by one or more of the display list generator task modules 221-223, fillmap generator task modules 231-233, fillmap merger task modules 241-242, and fillmap renderer task module 251 of the renderer module 205 of the printing system 115. As described above, renderer module 205 may be formed by one or more of the code modules of the controlling program 181 resident in the memory 190 and being controlled in its execution by the controller processors 170. In method 1100, each successive intermediate fillmap (in z-order) is merged with a previous merged result.

As described above, a PDL interpreter module 203 is used for receiving a page description language representation (PDL) of a page to be printed. The page description language (PDL) representation may have a plurality of sequential objects ordered by drawing order (i.e., z-order). In this instance, the PDL interpreter module 203 generates representations of the graphic objects (e.g., 204) to be printed. As also described above with reference to FIG. 9, the display list generator task modules 221-223 of the renderer module 205, upon receiving the graphic objects from the PDL interpreter module 203, are used for forming one or more (or "a plurality of") groups for sequentially adjacent graphic objects of the plurality of sequential objects according to the drawing order.

The method 1100 begins at display list generating step 1110, where a display list for a first group of graphic objects is generated. Step 1110 may be performed by one of the display list generator task modules 221-223. The display list is stored in the display list store 225 configured within memory 190.

Following step 1110, the method 1100 then proceeds to intermediate fillmap generating step 1120, where one or more of the fillmap generator task modules 231-233, under execution of the processors 170, are used for generating an intermediate representation for the display list corresponding to the first group of graphic objects. The generated intermediate representation is in the form of an intermediate fillmap for the first display list. The intermediate fillmap may be stored in the intermediate fillmap store 235 configured within the memory 190. The intermediate fillmap is stored as a resultant fillmap. The intermediate fillmap generated at step 1120 comprises a set of regions. For example, as described above with reference to FIGS. 5A and 5B, the fillmap edges 550, 555, 560, 565, and 570 divide the fillmap 234-1 into regions 510, 520, 530, and 540. Each region of the set of regions is associated with a set of operations required to render at least one of the adjacent graphic objects of the first group that intersect the region. As described above, in the example of FIG. 5A and 5B, each region 510, 520, 530, and 540 corresponds to a fill compositing sequence which is derived from the object group 501 in FIG. 5A. Each object that intersects region 510, for example, may be rendered using the fill compositing sequence corresponding to that region. The method 1100 then proceeds to decision step 1130. If, at step 1130, the controlling program 181, under execution of the processors 170, determines that further intermediate fillmaps remain to be generated, then the method 1100 continues to display list generating step 1140, where a display list for a next group of graphic objects is generated. Accordingly, the controlling program 181 is used for generating a display list for each group of graphic objects. Again, step 1140 may be performed by one of the display list generator tasks 221-223 under execution of the controller processors 170. The display list is stored in the display list store 225 configured within memory 190.

Following step 1140, the method 1100 then proceeds to intermediate fillmap generating step 1150, where one or more of the fillmap generator task modules 231-233, under execution of the processors 170, are used for generating an intermediate representation for the display list corresponding to the next group of graphic objects. Again, the intermediate representation is in the form of an intermediate fillmap for the next display list. Accordingly, an intermediate fillmap is generated for each of the groups of graphic objects.

The intermediate fillmap generated at step 1150 comprises a set of regions. As described above, each region of the set of regions is associated with a set of operations required to render at least one of the adjacent graphic objects of one of the groups that intersect the region. The intermediate fillmap generated at step 1150 may be stored in the intermediate fillmap store 235 configured with the memory 190. The intermediate fillmap generated at step 1150 is stored as a resultant fillmap.

Method 1100 then proceeds to determining step 1160. If, at step 1160, the controlling program 181, under execution of the processors 170, determines that the intermediate fillmaps in the set of intermediate fillmaps stored in intermediate fillmap store 235 are ready to be merged, then the method 1100 proceeds to step 1170. Otherwise, step 1170 is skipped and method 1100 returns to step 1130. The conditions considered by the controlling program 181 at step 1160 are:

a. number of intermediate fillmaps which have currently been generated and stored in the intermediate fillmap store 235 has reached a predetermined number, and b. amount of memory 190 occupied by intermediate fillmaps in the intermediate fillmap store 235 has exceeded a predetermined amount.

c. number of all generated intermediate fillmaps from entire display lists for a whole page is less than the predetermined number of condition a. above if the predetermined number is more than two.

The predetermined number of the condition a. above may be two or more. If the controlling program 181 determines at determining step 1160 that either a. the number of intermediate fillmaps in the intermediate fillmap store 235 has reached a predetermined number; or b. that the amount of memory 190 occupied by intermediate fillmaps in the intermediate fillmap store 235 exceeds a predetermined amount; then the method 1100 proceeds to merging step 1170.

At step 1170, in case of the above conditions a. and b. being met, the controller processors 170 are used to check whether some of the currently generated fillmaps are adjacent to each other according to a z-order perpendicular to a plane of the page to be printed. An intermediate fillmap including group objects which do not overlap other group objects in other fillmaps does not have to be checked and always becomes a candidate to be merged regardless of adjacency to other intermediate fillmaps. Then, one or more of the fillmap merger task modules 241-242, under execution of the controller processors 170, are used for selecting a set of intermediate fillmaps (or "intermediate representations") which are, according to z-order perpendicular to a plane of the page to be printed, adjacently (consecutively) located to each other from the generated intermediate fillmaps stored in the intermediate fillmap store 235. The fillmap merger task modules 241-242 merges the selected intermediate fillmaps. The set of fillmaps are selected independently of the drawing order of the plurality of sequential graphic objects. Other fillmaps which are not selected are not processed until at least one adjacent intermediate fillmap according to z-order is generated. The merged intermediate representation is a merged intermediate fillmap. Method 1100 then continues to step 1130. In the case of the condition c. above being met, intermediate fillmaps are merged in z-order without considering adjacency.

If step 1160 returns negative ("N"), step 1170 is skipped and method 1100 proceeds to step 1130.

If, at step 1130, the controlling program 181, under execution of the processors 170, determines that no further intermediate fillmaps remain to be generated, then the method 1100 proceeds to step 1180. At step 1180, the remaining intermediate fillmaps stored in the intermediate fillmap store 235 are merged with the resultant fillmap to produce a merged intermediate representation in the form of a final fillmap. Also at step 1180, the controlling program 181 is used for storing the final fillmap in the final fillmap store 244 configured within memory 190. If there are no intermediate fillmaps stored in the intermediate fillmap store 235, step 1180 does not need to perform any merging, and the resultant fillmap is directly assigned as the final fillmap. Method 1100 then proceeds to step 1190, where the final fillmap stored in the final fillmap store 244 is rendered using fillmap renderer task module 251. Method 1100 ends upon completion of step 1190.

Figure 12:
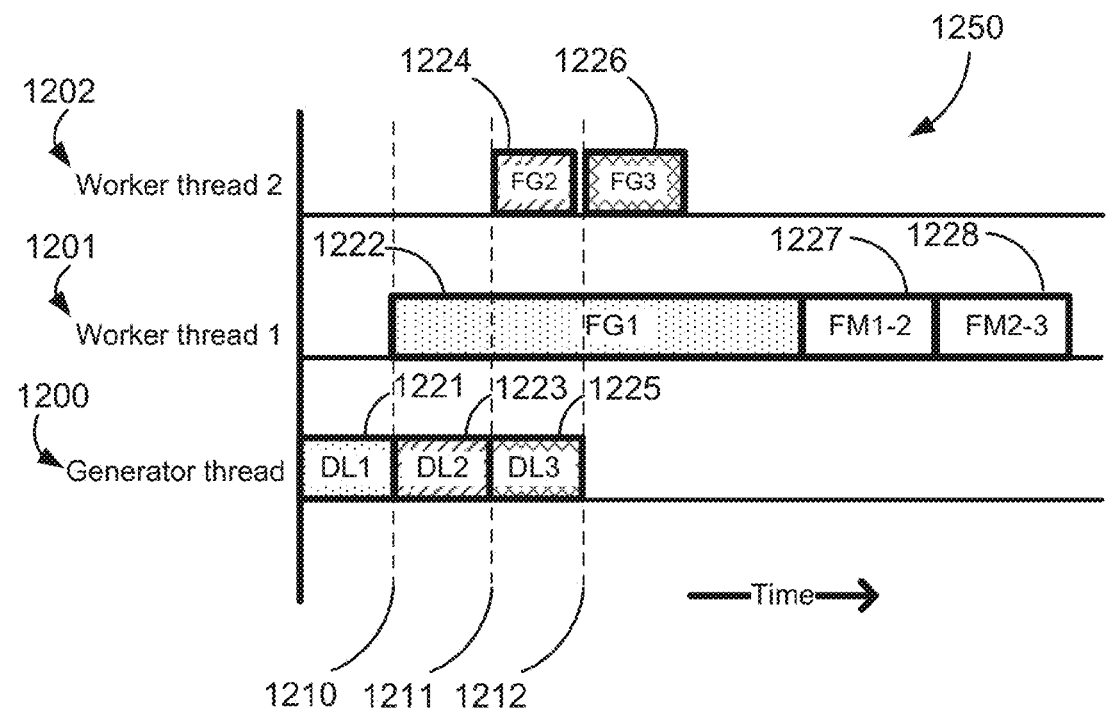
FIG. 12 shows a timing chart for the example shown in FIG. 9.

FIG. 12 shows a timing chart 1250 for merging the intermediate fillmaps in the example from FIG. 9 using multiple processors, such as controller processors 170. Display list generator tasks are executed on generator thread 1200 using one or more of the processors 171-174. Fillmap generator tasks, fillmap merger tasks, and fillmap renderer tasks are executed on worker threads 1201 and 1202 using one or more of the processors 171-174. The number of fillmaps to merge by a fillmap merger task is set is two (2). The graphic objects are split into three groups and are converted to three display lists by display list generator tasks 1221, 1223 and 1225. Display list generator task 1221 is used for processing the group of graphic objects with the lowest z-order. Display list generator task 1223 is used for processing the group of graphic objects with the next highest z-order. Display list generator task 1225 is used for processing the batch of graphic objects with the highest z-order.

The display list generated by display list generator task 1221 is converted to an intermediate fillmap by fillmap generator task 1222. Fillmap generator task 1222 cannot start before display list generator task 1221 finishes, at time 1210. The display list generated by display list generator task 1223 is converted to an intermediate fillmap by fillmap generator task 1224. Fillmap generator task 1224 cannot start before display list generator task 1223 finishes, at time 1211. The display list generated by display list generator task 1225 is converted to an intermediate fillmap by fillmap generator task 1226. Fillmap generator task 1226 cannot start before display list generator task 1225 finishes, at time 1212.

Fillmap merger task 1227 merges the two intermediate fillmaps produced by fillmap generator tasks 1222 and 1224. Fillmap merging of the two intermediate fillmaps produced by fillmap generator tasks 1222 and 1224 cannot start until both fillmap generation tasks 1222 and 1224 finish. Since, in the example of FIG. 12, fillmap generation tasks 1222 takes longer, fillmap merger task 1227 commences when fillmap generation tasks 1222 finishes. After fillmap merging task 1227 finishes, the fillmap merging task 1228 can start merging the intermediate fillmaps produced by fillmap generation task 1226 and the fillmap merger task 1227. Fillmap merger task 1228 produces the final fillmap.

Figure 13:
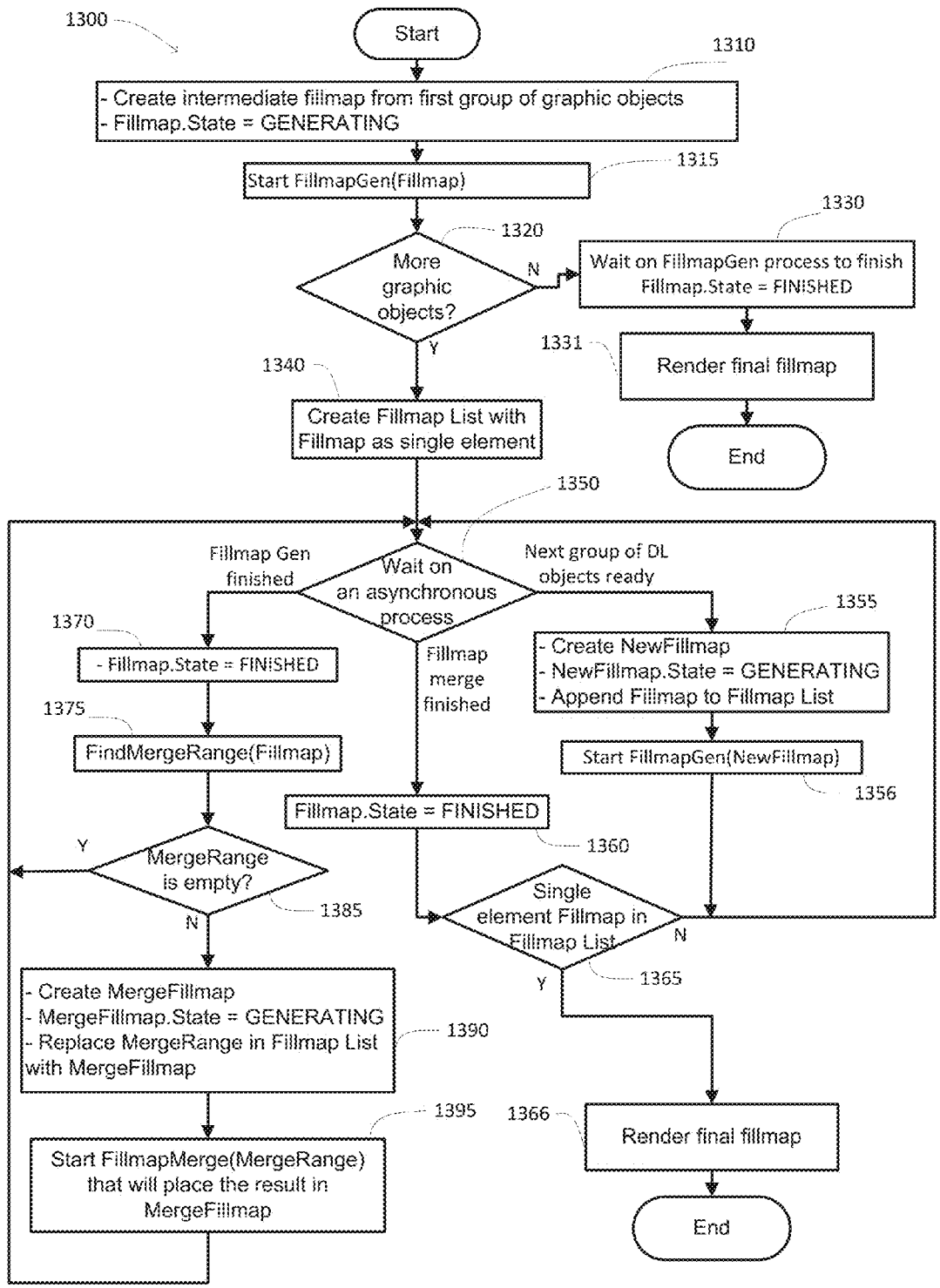
FIG. 13 shows a flow chart of another method of rendering a fillmap.

FIG. 13 is a flow chart of a method 1300 of a rendering a fillmap, using the renderer module 205 of FIG. 2B. The method 1300 may be used for determining a merged intermediate representation of a page to be printed. The method 1300 may be executed by one or more of the display list generator task modules 221-223, fillmap generator task modules 231-233, fillmap merger task modules 241-242, and fillmap renderer task module 251 of the renderer module 205 of the printing system 115. As described above, renderer module 205 may be formed by one or more of the code modules of the controlling program 181 resident in the memory 190 and being controlled in its execution by the controller processors 170.

In method 1300, an adjacently located set (or "consecutive sequence") of intermediate fillmaps according to z-order are merged by fillmap merger tasks whenever all intermediate fillmaps in the set have finished generating. The intermediate fillmaps of the adjacently located set may be selected for merging independently of the associated order of graphic objects (i.e., z-order) represented by each of the fillmaps. As described in detail below, each intermediate fillmap has an associated priority value which may be used to determine which of the intermediate fillmaps are selected for merging. However, the order of fillmap merging may not follow the order of fillmap generation (i.e., z-order).

Display list generation tasks, fillmap generator tasks, and fillmap merger tasks may be executed by the display list generator task modules 221-223, the fillmap generator task modules 231-233 and the fillmap merger task modules 241-242, respectively, as asynchronous processes using controller processors 170. The method 1300 synchronises asynchronous processes as described below. Each fillmap created by method 1300 has a Boolean "State" variable which describes the progress of the fillmap generation. The value of the Boolean "State" variable may be either "GENERATING" or "FINISHED". Each intermediate fillmap also has an associated priority value which is an integer number. An intermediate fillmap list configured within memory 190 is sorted by fillmap priorities. The priority of each intermediate fillmap is determined based on z-order. The priority is numbered to each fillmap from bottom to top in z-order.

As described above, a PDL interpreter module 203 is used for receiving a page description language (PDL) representation of a page to be printed. The page description language (PDL) representation may have a plurality of sequential graphic objects ordered by drawing order (i.e., z-order). In this instance, the PDL interpreter module 203 generates representations of the graphic objects (e.g., 204) to be printed. As also described above with reference to FIGS. 10A and FIG. 10B, the display list generator task modules 221-223 of the renderer module 205, upon receiving the graphic objects from the PDL interpreter module 203, are used for forming one or more groups for sequentially adjacent graphic objects of the plurality of sequential graphic objects according to the drawing order.

The method 1300 starts at initialising step 1310, where a first intermediate fillmap structure is created from a display list comprising a first group of graphic objects. A state variable configured within memory 190 and associated with the first intermediate fillmap is set to GENERATING (i.e., Fillmap.State=GENERATING). The priority of the first intermediate fillmap is also set to zero (0) as the highest priority because the first intermediate fillmap is bottommost. The method 1300 then proceeds from step 1310 to generation step 1315 where a signal is sent to one or more of the fillmap generator task modules 231-233 to start the process of fillmap generation (i.e., Start process FillmapGen (Fillmap)). The fillmap generation process is used for generating an intermediate representation for the first group of objects. As described above, the intermediate representation is in the form of an intermediate fillmap. As also described above, the intermediate fillmap comprises a set of regions where each region of the set of regions is associated with a set of operations required to render at least one of the adjacent graphic objects of the first group that intersect the region.

The method 1300 then proceeds from step 1315 to decision step 1320. If the controlling program 181, under execution of the processors 170, determines that no further intermediate fillmaps are to be generated, because there are no more graphic objects, then the method 1300 proceeds to waiting step 1330.

At waiting step 1330, the controlling program 181 waits for the finish of fillmap generation process (i.e., FillmapGen (Fillmap)) signaled in step 1315, then sets the fillmap state variable to FINISHED. Method 1300 then proceeds to step 1331 where the fillmap generated in accordance with the fillmap generation process is rendered.

If the controlling program 181 determines that further intermediate fillmaps are to be generated at decision step 1320, then the method 1300 continues to creating step 1340. At step 1340, a Fillmap List is created within memory 190. The Fillmap List contains a single Fillmap element referring to the intermediate fillmap created in step 1315.

Control then proceeds from step 1340 to waiting step 1350. At step 1350, the controlling program 181, under execution of the processors 170, waits for any asynchronous processes (i.e. display list generation tasks, fillmap generator tasks, and fillmap merger tasks) to signal that the fillmap generation process (i.e., FillmapGen(Fillmap)) is finished, a fillmap merge process (i.e., MergeFillmap( )) is finished or that a next group of objects is ready to be processed.

If at step 1350, the controlling program 181 determines that a next group of PDL graphic objects are ready for fillmap generation, then the method proceeds to step 1355. A display list has been formed at step 1350 for the next group of objects as described above, for example, with reference to FIG. 10A.

At initialising step 1355, the controlling program 181 is used for creating a new intermediate fillmap structure for the next group of graphic objects. Accordingly, an intermediate fillmap will be generated for of the next group of graphic objects. A state variable of the new intermediate fillmap is set to "GENERATING" (i.e., NewFillmap.State=GENERATING), priority of the new intermediate fillmap is set to the priority of the last element in the Fillmap List+1, and the new intermediate fillmap is appended to the Fillmap List (i.e., Append Fillmap to Fillmap List). The method 1300 then proceeds from step 1355 to generation step 1356 where a signal to one or more of the fillmap generator task modules 231-233 to start the process of fillmap generation (i.e., Start Fillmap Gen(NewFillmap). Then following step 1356 the method 1300 returns to step 1350.

If at step 1350 the controlling program 181, under execution of the processors 170, determines that a fillmap generation task has finished, then the method 1300 moves to setting step 1370 where the state variable of the intermediate fillmap generated by either of steps 1315 or 1356 is set to "FINISHED".

Then following step 1370 the method 1300 moves to determining step 1375. At step 1375, the controlling program 181 determines a range of adjacently located (or "consecutive") intermediate fillmaps that are ready to merge (i.e., FingMergeRange(Fillmap). As described above, the adjacently located set of intermediate fillmaps are selected for merging at step 1375 independently of the associated order of the graphic objects of the selected intermediate fillmaps. The range of adjacently located intermediate fillmaps according to z-order is determined based on a sub-list of the Fillmap List containing the finished adjacent intermediate fillmaps. However, the intermediate fillmaps that do not spatially overlap with other intermediate fillmaps, such as fillmap 919 in FIG. 10B, can be merged with other intermediate fillmaps in an altered order. The range is determined at step 1375 by checking priority associated with each intermediate fillmap. Step 1375 will be described in more detail below with reference to FIG. 14.

If the controlling program 181 determines at decision step 1385 that the range of adjacently located intermediate fillmaps is empty, then the method 1300 returns to step 1350. Otherwise, the method 1300 proceeds to initialising step 1390.

At step 1390, the controlling program 181 is used for creating a new MergedFillmap data structure within memory 190. The MergedFillmap data structure may be used for storing the result of merging the intermediate fillmaps. Also at step 1390, the controlling program 181 is used for setting the state of the MergeFillmap data structure to "GENERATING" and the priority of the MergedFillmap data structure is set to the priority of a last fillmap element in the sub-list determined in step 1375. The sub-list determined in step 1375 is replaced within memory 190 with the new MergeFillmap data structure.

Following step 1390, the method 1300 then moves to merging step 1395. At step 1395, the controlling program 181 sends a signal to one or more of the Fillmap Merger task modules 241-242 (i.e., Start FillmapMerge(MergeRange). The Fillmap Merger task modules 241-242 are used for merging the adjacently located set of the intermediate fillmaps listed in the sub-list of intermediate fillmaps determined at step 1375 to determine a merged intermediate fillmap. The merging of the intermediate fillmaps at step 1395 will be described in more detail below with reference to FIG. 14. The merged intermediate fillmap resulting from the merge is placed in the MergeFillmap data structure configured within memory 190. The method 1300 then returns to step 1350 following step 1395.

If the controlling program 181 determines at step 1350 that a Fillmap Merging task has finished, then the method 1300 proceeds to setting step 1360. At step 1360, the controlling program 181 is used for setting the state of the just merged intermediate fillmap to "FINISHED" and moves to decision step 1365. At decision step 1365, if the controlling program 181 determines that the merged intermediate fillmap is the only fillmap in the fillmap list (i.e., Fillmap List) configured within memory 190, then the merged intermediate fillmap is the final fillmap. Method 1300 then proceeds to step 1366 where the final fillmap is rendered by the controlling program 181.

If, at decision step 1365, the controlling program 181 determines that the merged intermediate fillmap is not the only fillmap in the fillmap list (i.e., Fillmap List) configured within memory 190, then the method 1300 returns to step 1350. Otherwise, the method 1300 proceeds to step 1366. If the merged intermediate fillmap is not the only fillmap in the fillmap list, then other intermediate fillmaps are still being processed and at least one more merge needs to be executed before final fillmap is determined.

Figure 14:
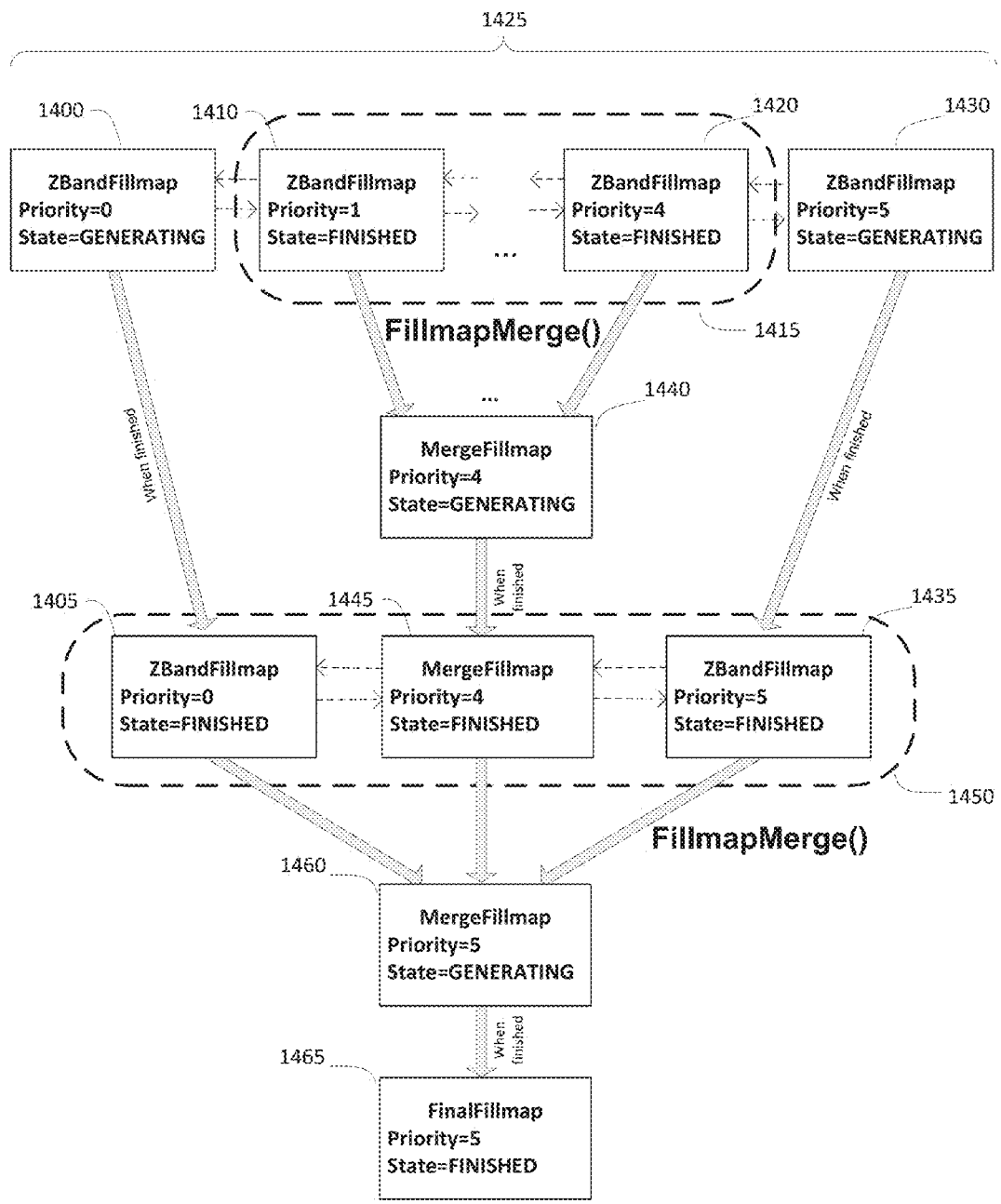
FIG. 14 shows a list of intermediate fillmaps processed in accordance with the method of FIG. 13.

The merging of the intermediate fillmaps at steps 1375 through 1395 will now be described in more detail with reference to FIG. 14. FIG. 14 shows a list of intermediate fillmaps 1425, resulting from splitting the graphic objects of the page description language (PDL) representation of the page to be printed into six (6) groups of objects. Each intermediate fillmap corresponding to a given group of objects receives integer priority (i.e., Priority) according to z-order. The list is of intermediate fillmaps is ordered according to priority. Fillmap 1400 of priority 0 (i.e., Priority=0) is the first element in the list 1425, intermediate fillmap 1410 of priority 1 (i.e., Priority=1) is the second element in the list 1425, intermediate fillmap 1420 of priority 4 (i.e., Priority=4) is the second last element in the list 1425, and finally intermediate fillmap 1430 of priority 5 (i.e., Priority=5) is the last element in the list 1425. Fillmaps of priorities two (2) to three (3) (not shown) are between intermediate fillmap 1410 and intermediate fillmap 1420 in the list 1425. The intermediate fillmaps in the list 1425 are called z-band fillmaps because the intermediate fillmaps are derived by converting groups of PDL graphic objects. By way of example, FIG. 14 illustrates intermediate fillmaps 1400 and 1430 to be in the process of generating based on the state variable associated with each of the fillmaps (i.e., State=GENERATING), while other intermediate fillmaps have already been generated (i.e., State=FINISHED). Any fillmap that does not overlap with other fillmaps in the list of fillmaps 1425, such as fillmap 919 in FIG. 10B, can be assigned an altered Priority and may be moved within the list of fillmaps 1425. However, if any two fillmaps in the list of fillmaps 1425 spatially overlap, the relative order of the spatially overlapping fillmaps in the list of fillmaps 1425 must be preserved.

By way of example, suppose that generation of intermediate fillmaps with priorities one (1) to four (4) had finished, intermediate fillmap 1420 has just been finished at step 1370. After step 1370 is executed, a routine FindMergeRange is called by the controlling program 181 with intermediate fillmap 1420 as a parameter at step 1375. Routine FindMergeRange traverses the list of intermediate fillmaps from intermediate fillmap 1420 in both directions of the list 1425 to detect the longest sublist (range) of consecutive fillmaps having been set to FINISHED. In the example of FIG. 14, such a sublist is sublist 1415. Then at step 1390, a new MergeFillmap 1440 is created and replaces the sublist 1415 in list 1425. Then a routine FillmapMerge is called by the controlling program 181 with sublist 1415 as input and MergeFillmap 1440 as output argument. Fillmap Merger 241 or 242, upon finishing executing FillmapMerge, destroys the sublist 1415 and places the result of FillmapMerge in MergeFillmap 1440. Alternatively, the FindMergeRange process may wait for detecting a number of consecutive fillmaps in z-order. If the number of consecutive fillmaps in z-order are detected at step 1375, the consecutive fillmaps may be merged at step 1390. The number of consecutive fillmaps may be determined based on usage of memory 190.

When routine FillmapMerge initiated at step 1390 as described above and the two remaining fillmap generation processes working on intermediate fillmaps 1400 and 1430, all finish, the list of intermediate fillmaps, previously shown as list 1425, becomes as shown in list 1450. List 1450 has three elements: ZBandFillmap 1405 which is the result of fillmap 1400 finishing generation, MergeFillmap 1445 which is the result of FillmapMerge finished fillmap 1440 and ZBandFillmap 1435 which is the result of intermediate fillmap 1430 finishing generation.

By way of example, suppose that at step 1350, intermediate fillmap 1430 was the last fillmap to be finished and then at step 1370, intermediate fillmap 1430 became fillmap 1435. Then, another call to routine FindMergeRange by the controlling program 181 with intermediate fillmap 1435 as parameter in step 1375 determines the range of intermediate fillmaps to merge to be the entire list 1450, because all intermediate fillmaps in the list have their state variable set to FINISHED (i.e., State=Finished). At step 1395, routine FillmapMerge is called by the controlling program 181 with list 1450 as input and MergeFillmap 1460 as output argument. After the call of the FillmapMerge is finished, the MergeMap 1460 becomes a fillmap 1465. Fillmap 1465 becomes the final fillmap because fillmap 1465 is the only fillmap left in Fillmap List. Therefore, fillmap 1465 is returned as the resulting final fillmap.

Figure 15:
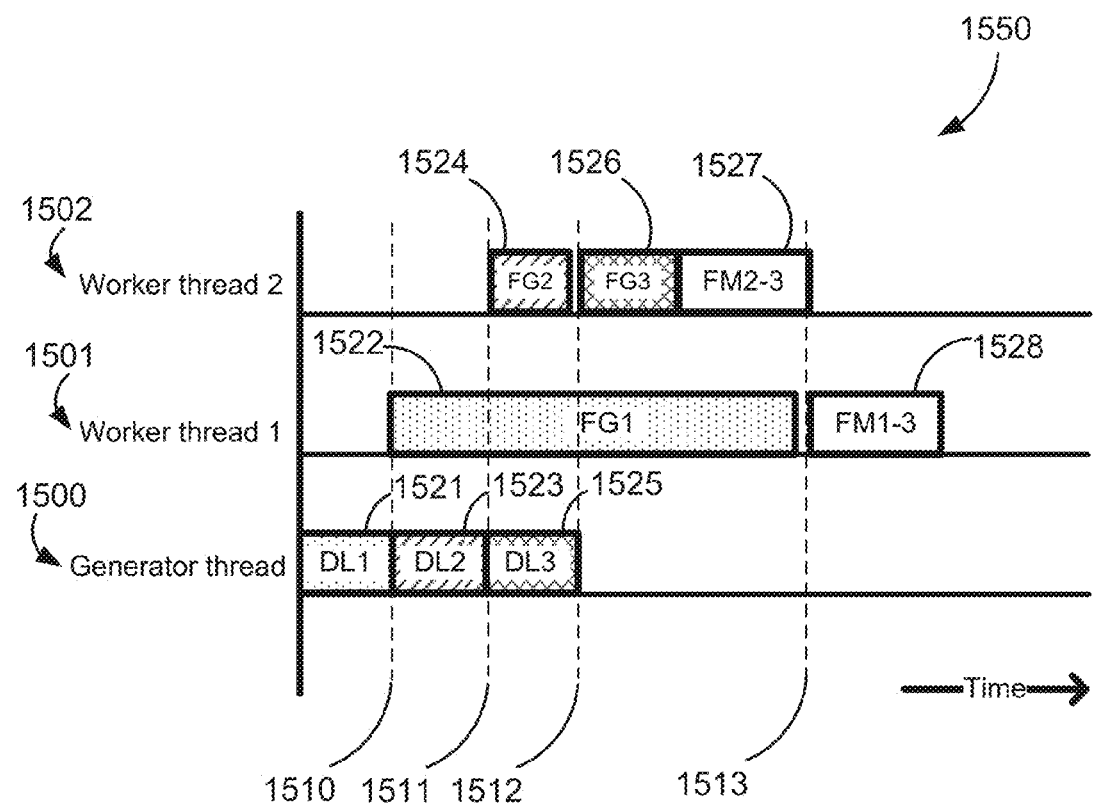
FIG. 15 shows a timing chart for the example shown in FIG. 10A.

FIG. 15 shows a timing chart for the merging of intermediate fillmaps in accordance with the example of FIG. 10A using multiple processors, such as controller processors 170. The number of fillmaps in the range of fillmaps selected by the FindMergeRange step 1375 is two (2). Display list generator tasks are executed on generator thread 1500 using one or more of the processors 171-174. Fillmap generator tasks, fillmap merger tasks, and fillmap renderer tasks are executed on worker threads 1501 and 1502 using one or more of the processors 171-174. The graphic objects are split into three groups and are converted to three display lists by display list generator tasks 1521, 1523 and 1525. Display list generator task 1521 processes the group of graphic objects with the lowest z-order. Display list generator task 1523 processes the group of graphic objects with the next highest z-order. Display list generator task 1525 processes the group of graphic objects with the highest z-order.

The display list generated by display list generator task 1521 is converted to an intermediate fillmap by fillmap generator task 1522. Fillmap generator task 1522 cannot start before display list generator task 1521 finishes, at time 1510. The display list generated by display list generator task 1523 is converted to an intermediate fillmap by fillmap generator task 1524. Fillmap generator task 1524 cannot start before display list generator task 1523 finishes, at time 1511. The display list generated by display list generator task 1525 is converted to an intermediate fillmap by fillmap generator task 1526. Fillmap generator task 1526 cannot start before display list generator task 1525 finishes, at time 1512.

Fillmap merger task 1527 merges the two intermediate fillmaps produced by fillmap generator tasks 1525 and 1526. Fillmap merging of the two intermediate fillmaps produced by fillmap generator tasks 1524 and 1526 cannot start until fillmap generation task 1526 finishes. After fillmap merging task 1527 finishes, the fillmap merging task 1528 can start merging the intermediate fillmaps produced by fillmap generation task 1522 and the fillmap merger task 1527, at time 1513. Fillmap merger task 1528 produces the final fillmap.

The described methods allow the first fillmap merger task 1527 to begin before the fillmap generation task 1522 for the graphic objects with the lowest z-order is complete. Allowing the first fillmap merger task 1527 to begin in such a manner helps to reduce idle time of threads, and reduces overall time taken to process all graphic objects.

INDUSTRIAL APPLICABILITY

The arrangements described are applicable to the computer and data processing industries and particularly for the efficient management of threads in a multiprocessor environment. The arrangements are particularly applicable to the generation of fills and fillmaps in graphic object page rendering.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A computer implemented method for controlling an image rendering device to merge intermediate representations of a page to be rendered, the method comprising:
   receiving a page description language representation of the page, the page description language representation having a plurality of sequential graphic objects ordered by drawing order;
   forming a plurality of groups of sequentially adjacent graphic objects of the plurality of sequential objects, each group being associated with a z-order according to the drawing order;
   generating an intermediate representation from each of the groups, wherein at least two of the intermediate representations are generated concurrently;
   creating a data structure comprising records each corresponding to one of the intermediate representations, a priority of each of the records, and a status of generating the corresponding intermediate representation;
   merging by the image rendering device, in the z-order, at least two intermediate representations consecutive in the z-order to form a merged intermediate representation independently of an intermediate representation preceding, in the z-order, the at least two intermediate representations, wherein the at least two intermediate representations are selected using the priority and status of the records in the created data structure; and
   merging, by the image rendering device using the created data structure, the merged intermediate representation and the intermediate representation preceding the merged representation in the z-order to render the page.

2. The method according to claim 1, wherein one or more steps of the method are executed in parallel.

3. The method according to claim 1, further comprising generating a display list for each group of graphic objects.

4. The method according to claim 1, further comprising determining if an amount of memory occupied by the intermediate representations exceeds a predetermined amount wherein the set of intermediate representations is selected if the amount of memory occupied by the intermediate representations exceeds the predetermined amount.

5. The method according to claim 1, wherein each of the intermediate representations has a variable describing progress of intermediate representation generation.

6. The method according to claim 1, wherein each of the intermediate representations has an associated priority value.

7. The method according to claim 1, wherein one of the intermediate representations that includes a plurality of sequential graphic objects which do not overlap other objects in others of the intermediate representations is a candidate to be merged regardless of adjacency to the other intermediate representations.

8. The method according to claim 1, wherein the merged intermediate representation comprises a plurality of edges pointing to fill compositing sequences, which refer to fill indices.

9. The method according to claim 1, wherein merging the at least two consecutive z-order intermediate representations is performed before a lower z-order intermediate representation is generated.

10. The method according to claim 1, wherein the at least two consecutive z-order intermediate representations are merged while a lower z-order intermediate representation is being generated.

11. The method according to claim 1, wherein each of the intermediate representations comprises a set of regions where each region of the set of regions is associated with a set of operations required to render at least one of the adjacent graphic objects of one of the groups that intersect the region.

12. The method according to claim 11, wherein each region corresponds to a fill compositing sequence.

13. The method according to claim 1, further comprising selecting, independently of the drawing order of the plurality of sequential graphic objects, the at least two intermediate representations consecutive in z-order from the intermediate representations which have been generated.

14. The method according to claim 13, wherein the generated data structure comprises a list of the intermediate representations being generated, each entry in the created list referencing a corresponding one of the intermediate representations and is associated with a state variable defining the progress of generating the corresponding intermediate representation.

15. The method according to claim 14, wherein the least two intermediate representations consecutive in z-order are selected based on the list and the associated state variables.

16. The method according to claim 14, wherein the least two intermediate representations consecutive in z-order are selected by determining, within the list, a sub-list of intermediate representations associated with 'FINISHED' state variable.

17. An apparatus for determining a merged intermediate representation of a page, the apparatus comprising:
 a memory for storing data and a computer program;
 a processor coupled to the memory for executing the computer program, the computer program comprising instructions for:
  receiving a page description language representation of the page, the page description language representation having a plurality of sequential graphic objects ordered by drawing order;
  forming a plurality of sequentially adjacent graphic objects of the plurality of sequential objects, each group being associated with a z-order according to the drawing order;
  generating an intermediate representation from each of the groups, wherein at least two of the intermediate representations are generated concurrently;
  creating a data structure comprising records each corresponding to one of the intermediate representations, a priority of each of the records, and a status of generating the corresponding intermediate representation; and
  merging, in the z-order at least two intermediate representations consecutive in the z-order to form a merged intermediate representation independently of an intermediate representation preceding, in the z-order, the at least two intermediate representations, wherein the at least two intermediate representations are selected using the priority and status of the records in the created data structure; and
  merging, using the created data structure, the merged intermediate representation and the intermediate representation preceding the merged representation in the z-order to render the page.

18. A computer non-transitory readable medium having recorded there a computer program for determining a merged intermediate representation of a page, the program comprising:
 code for receiving a page description language representation of the page, the page description language representation having a plurality of sequential graphic objects ordered by drawing order;
 code for forming a plurality of sequentially adjacent graphic objects of the plurality of sequential objects, each group being associated with a z-order according to the drawing order;
 code for generating an intermediate representation from each of the groups, wherein at least two of the intermediate representations are generated concurrently;
 code for creating a data structure comprising records each corresponding to one of the intermediate representations, a priority of each of the records, and a status of generating the corresponding intermediate representation;
 code for merging, in the z-order, at least two intermediate representations consecutive in the z-order to form a merged intermediate representation independently of an intermediate representation preceding, in the z-order, the at least two intermediate representations, wherein the at least two intermediate representations are selected using the priority and status of the records in the created data structure; and
 merging, by the image rendering device using the created data structure, the merged intermediate representation and the intermediate representation preceding the merged representation in the z-order to render the page.

19. A computer-implemented method for merging intermediate representations of a page to be rendered, the method comprising:
 receiving, by an image rendering device, a page description language representation of the page, the page description language representation having a plurality of sequential graphic objects ordered by drawing order;
 forming a plurality of groups of sequentially adjacent graphic objects of the plurality of sequential objects, each group being associated with a z-order according to the drawing order;
 generating an intermediate representation from each of the groups, wherein at least two of the intermediate representations are generated concurrently;
 creating a data structure comprising records each corresponding to one of the intermediate representations, a z-order for each of the records, and a status of generating the corresponding intermediate representation;
 determining whether the generated intermediate representations form a first set of intermediate representations adjacent in the z-order using the z-order and status of the records in the created data structure;
 merging, by the image rendering device, the first set of consecutive z-order intermediate representations in accordance with the associated z-orders to form a merged intermediate representation; and
 determining, using the created data structure, whether the merged intermediate representation and an intermediate representation preceding the merged intermediate representation in the z-order form a second set of intermediate representations adjacent in the z-order; and
 merging the second set of consecutive z-order intermediate representations to render the page.

20. The method according to claim 19, wherein the first set of intermediate representations is selected when a number of generated intermediate representations reaches a predetermined number.

21. The method according to claim 20, wherein the predetermined number is two.

22. The method according to claim 19, wherein the merged intermediate representation is formed independently of a lower z-order intermediate representation, wherein the lower z-order intermediate representation is stored on the memory device.

23. The method according to claim 22, wherein at least one graphic object forming the merged intermediate representation overlaps at least one graphic object forming the lower z-order intermediate representation.

24. The method according to claim 23, wherein the at least one graphic object forming the merged intermediate representation is at least partially transparent.

25. The method according to claim 19, wherein each of the intermediate representations is associated with a corresponding state variable defining the progress of generating said intermediate representation.

26. A computer implemented method for controlling an image rendering device to merge intermediate representations of a page to be rendered, the method comprising:

receiving a page description language representation of the page, the page description language representation having a plurality of sequential graphic objects ordered by drawing order;

forming a plurality of groups of sequentially adjacent graphic objects of the plurality of sequential objects, each group being associated with a z-order according to the drawing order;

generating an intermediate representation from each of the groups, wherein at least two of the intermediate representations are generated concurrently; and merging, in the z-order, by the image rendering device, at least two intermediate representations adjacent in the z-order to form a merged intermediate representation, the intermediate representations being stored on a memory device to render the page, wherein the at least two intermediate representations are determined using the z-order and status of records in a data structure comprising records each corresponding to one of the intermediate representations, each record comprising a z-order of a corresponding intermediate representation and a status of generating the corresponding intermediate representation.

* * * * *